United States Patent
Aridome et al.

(10) Patent No.: US 7,716,259 B2
(45) Date of Patent: May 11, 2010

(54) FILE SPLITTING APPARATUS, FILE SPLITTING METHOD AND FILE SPLITTING PROGRAM

(75) Inventors: Kenichiro Aridome, Kanagawa (JP); Shinya Kano, Chiba (JP)

(73) Assignee: Sony Corporation, Tokyo (JP)

( * ) Notice: Subject to any disclaimer, the term of this patent is extended or adjusted under 35 U.S.C. 154(b) by 375 days.

(21) Appl. No.: 11/736,787

(22) Filed: Apr. 18, 2007

(65) Prior Publication Data

US 2008/0046614 A1    Feb. 21, 2008

(30) Foreign Application Priority Data

Jun. 30, 2006  (JP) ............ 2006-182210

(51) Int. Cl.
G06F 12/00 (2006.01)
G06F 7/00 (2006.01)
G06K 9/64 (2006.01)

(52) U.S. Cl. .................... 707/822; 382/233
(58) Field of Classification Search ............ None
See application file for complete search history.

(56) References Cited

U.S. PATENT DOCUMENTS 6,219,043 B1    4/2001  Yogeshwar et al.
6,725,343 B2 *  4/2004  Barroso et al. ............ 711/145

2005/0089312 A1    4/2005  Shirakawa et al.
2005/0256967 A1 * 11/2005  Winter ...................... 709/231

FOREIGN PATENT DOCUMENTS

| EP | 1 020 862 A2 | 7/2000 |
| JP | 2004-5867 | 1/2004 |
| JP | 2005-32745 | 2/2005 |

OTHER PUBLICATIONS

Sitter, Martin et al., Apple Pro Training Series: DVD Studio Pro 4, Nov. 2, 2005, Peachpit Press, Chapter 17, level 1, section 3, ISBN 978-0-321-33482-4.*

* cited by examiner

*Primary Examiner*—Pierre M Vital
*Assistant Examiner*—Romney J Hogaboam
(74) *Attorney, Agent, or Firm*—Oblon, Spivak, McClelland, Maier & Neustadt, L.L.P.

(57) ABSTRACT

A file splitting apparatus for splitting a data file recorded over a plurality of recording management regions arranged in the recording region of a recording medium, the apparatus including a management region detecting section for detecting a management region including a file splitting position, a management region recording part copying section for copying the management region recording part including the file splitting position; and a management information altering section for altering the management information of the data file to first management information for managing one of the split data files obtained by splitting the data file at the file splitting position and second management information for managing the other split data file.

9 Claims, 13 Drawing Sheets

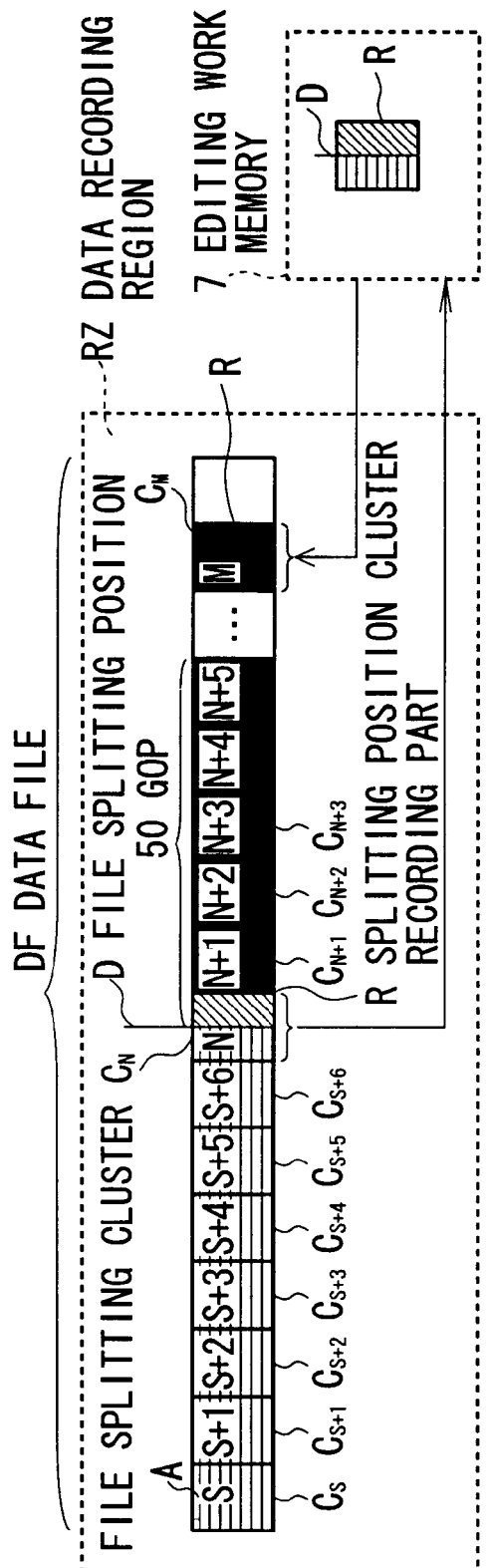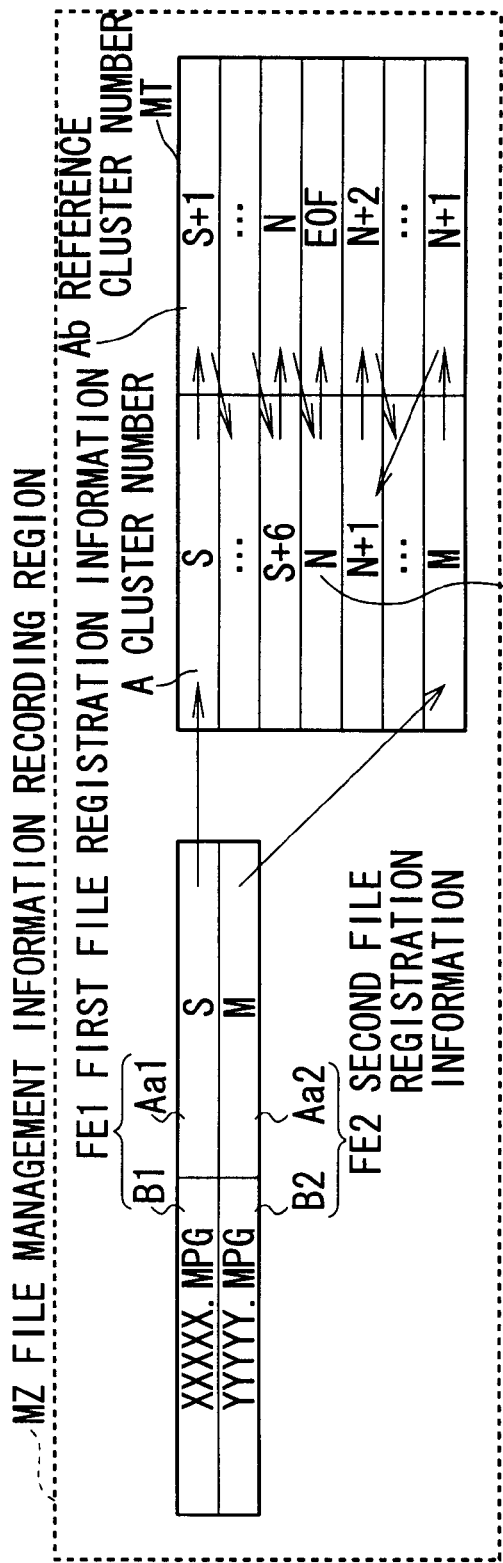
FIG. 4A
FIG. 4B

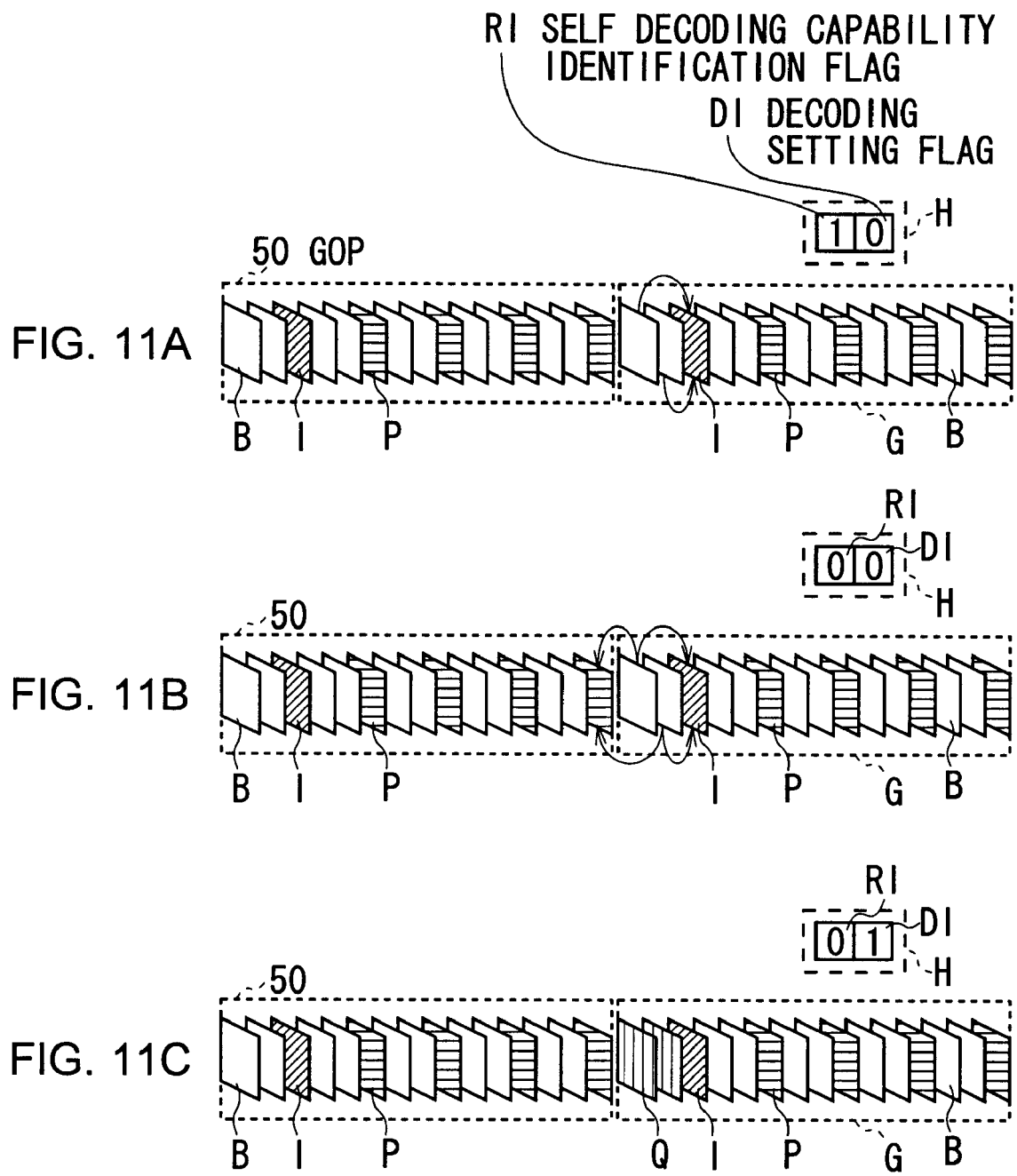

FILE SPLITTING APPARATUS, FILE SPLITTING METHOD AND FILE SPLITTING PROGRAM

CROSS REFERENCES TO RELATED APPLICATIONS

The present invention contains subject matter related to Japanese Patent Application JP 2006-182210 filed in the Japanese Patent Office on Jun. 30, 2006, the entire contents of which being incorporated herein by reference.

BACKGROUND OF THE INVENTION

1. Field of the Invention

The present invention relates to a file splitting apparatus, a file splitting method and a file splitting program that can suitably be applied to a video recorder integral with a camera (to be referred to as video camera hereinafter) for picking up an image of a subject as moving image and recording the generated moving image data as data file.

2. Description of the Related Art

Known recording/reproduction apparatus are adapted to define a data recording region for recording data files and a management information recording region for recording management information necessary for managing the data files according to a File Allocation Tables (FAT) file system. Additionally, recording/reproduction apparatus are adapted to define a plurality of recording management regions (to be referred to clusters hereinafter) for the data recording region according to the FAT file system and also record a management table for managing recording/reproduction of data files by each part thereof for which management information is recorded in a cluster (to be referred to as cluster recording part hereinafter) of the data files.

With this arrangement, the recording/reproduction apparatus manages recording/reproduction of data files in the data recording region of a recording medium by mean of the management table, utilizing the FAT file system. Additionally, the recording/reproduction apparatus manages splitting of data files recorded in the data recording region of the recording medium jointly utilizing some other file system defined based on the FAT file system (see, e.g., Jpn. Pat. Appln. Laid-Open Publication No. 2004-5867)

SUMMARY OF THE INVENTION

Meanwhile, apart from the management table for managing recording/reproduction of data files, utilizing a FAT file system, the recording/reproduction apparatus records a management table dedicated to the management of splitting of data files, utilizing some other file system. In other words, the recording/reproduction apparatus secures a management information recording region having an area that is large enough for recording management tables of two different types in the limited recording region of the recording medium. However, efforts are being made for recording/reproduction apparatus to reduce the management information recording region to such an extent that it can only record a management table of a single type and enlarge the large data recording region so much by managing not only recording/reproduction but also splitting of data files typically by means of only a FAT file system in order to effectively utilize the recording region of the recording medium for recording data riles.

However, when a data file that is recorded in the data recording region of a recording medium for over a plurality of clusters are to be split at a predetermined file splitting position, the file splitting position may be located midway of the cluster recording part of a cluster. If such is the case and only a FAT file system is adopted, the cluster recording part that includes the file splitting position (to be referred to as splitting position cluster recording part hereinafter) covers both the rear part of the split data file (to be referred to as split data file DFb hereinafter) and the front part of the split data file (to be referred to as split data file DFa hereinafter) obtained by splitting the data file, although the splitting position cluster recording part cannot manage the two parts of the split data file at the same time due to the configuration of a management table.

For this reason, as shown in FIGS. 13A and 13B of the accompanying drawings, when a file splitting position D is located midway of a cluster recording part (the split position cluster recording part) after splitting a data file, the recording/reproduction apparatus where only a FAT file system is adopted moves either of the two split data files DFa and DFb including the front side split data file DFa that precedes the file splitting position D and the rear side split data file DFb that succeeds the file splitting position D to some other recording location, e.g., the rear side split data file DFb, copying the rear side split data file DFb from the split position cluster recording part R down to the tail end cluster recording part of the split data file DFb over a plurality of clusters C that have not been recorded yet. Additionally, the recording/reproduction apparatus deletes the plurality of cluster recording parts for the rear side split data file DFb before the split except the split position cluster recording part R before the copying. As a result, the recording/reproduction apparatus is required to separate the split data file DFa that is left intact from the leading cluster recording part to the split position cluster recording part R before the copying from the other split data file DFb (that has been moved) and manage them independently according to the management table. In short, when only a FAT file system is adopted and the file splitting position D is found midway of a split position cluster recording cluster part R, the recording/reproduction apparatus is required to record the split data file DFb once again to give rise to a problem of cumbersomeness of the process of splitting a data file.

The present invention has been made in view of the above-mentioned and realizes a file splitting apparatus, a file splitting method and a file splitting program that can execute a data file splitting process in a simplified manner.

In an aspect of the present invention, there is provided a file splitting apparatus for splitting a data file recorded over a plurality of recording management regions arranged in the recording region of a recording medium, the apparatus including: a management region recording part detecting section for detecting a management region recording part including a file splitting position out of a plurality of management region recording parts of a plurality of recording management regions of the data file recorded in the recording region at the time of being split at a predetermined file splitting position; a management region recording part copying section for copying the management region recording part including the file splitting position as detected by the management region recording part detecting section to some other recording management region of the recording region; and a management information altering section for altering the management information of the data file to first management information for managing one of the split data files obtained by splitting the data file at the file splitting position and second management information for managing the other split data file; the management information altering section being adapted to alter the management information of the data file to the first management information of one of the split data files so as to make it contain the management region recording part including the file splitting position before the copying as part thereof and the second management information of the other split data file so as to make it contain the management region recording part including the copied file splitting position.

Thus, according to the present invention, when a recording/reproduction apparatus splits a data file recorded over a plurality of recording management regions arranged in the recording region of a recording medium at a predetermined file splitting position, it detects the management region recording part including the file splitting position out of the plurality of management region recording parts recorded in a plurality of recording management regions of the data file, copies the detected management region recording part including the file splitting position in some other recording management region of the recording region and alters the management information of the data file to first management information for managing one of the split data files obtained by splitting the data file at the file splitting position and second management information for managing the other split data file, while it alters the first management information so as to make the former split data file contain the management region recording part including the file splitting position before the copying as part thereof and the second management information so as to make the other split data file contain the management region recording part including the copied file splitting position. With this arrangement, when a data file recorded in the recording region of a recording medium is split, the recording/reproduction apparatus only needs to copy the management region recording part that includes the file splitting position to some other recording management region and alter the management information of the data file to split the data file.

According to the present invention, when a recording/reproduction apparatus splits a data file recorded over a plurality of recording management regions arranged in the recording region of a recording medium at a predetermined file splitting position, it detects the management region recording part including the file splitting position out of the plurality of management region recording parts recorded in a plurality of recording management regions of the data file, copies the detected management region recording part including the detected file splitting position in some other recording management region of the recording region and alters the management information of the data file to first management information for managing one of the split data files obtained by splitting the data file at the file splitting position and second management information for managing the other split data file, while it alters the first management information so as to make the former split data file contain the management region recording part including the file splitting position before the copying as part thereof and the second management information so as to make the other split data file contain the management region recording part including the copied file splitting position. With this arrangement, when a data file recorded in the recording region of a recording medium is split, the recording/reproduction apparatus only needs to copy the management region recording part that includes the file splitting position to some other recording management region and alter the management information of the data file to split the data file. Thus, it is possible to realize a file splitting apparatus, a file splitting method and a file splitting program that can execute a data file splitting process in a simplified manner.

The nature, principle and utility of the invention will become more apparent from the following detailed description when read in conjunction with the accompanying drawings in which like parts are designate by like reference numerals or characters.

BRIEF DESCRIPTION OF THE DRAWINGS

In the accompanying drawings:

FIGS. 4A and 4B are schematic illustrations of splitting a data file;

FIGS. 11A through 11C are schematic illustrations of GOP structures; and

DETAILED DESCRIPTION OF THE PREFERRED EMBODIMENTS

Now, preferred embodiments of the present invention will be described in greater detail by referring to the accompanying drawings.

(1) First Embodiment (1-1) Configuration of Video Camera

Figure 1:
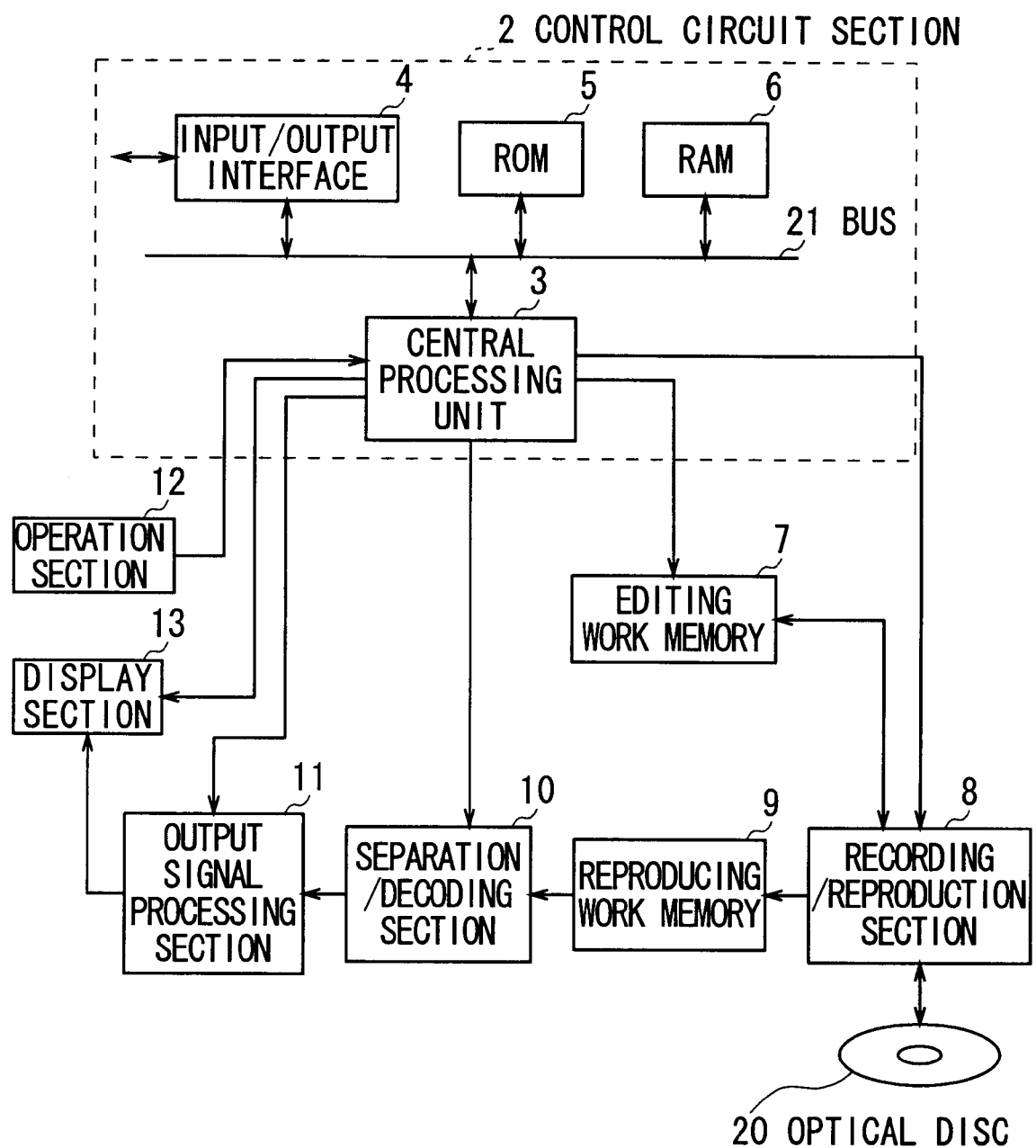
FIG. 1 is a schematic block diagram according to a first embodiment of the present invention, which is a video camera, showing the circuit configuration thereof.

In FIG. 1, reference numeral 1 generally denotes the video camera according to the first embodiment of the present invention. When an optical disc 20 such as a Digital Versatile Disc (DVD) is mounted in the main body (not shown) of the video camera 1, a central processing unit 3 of a control circuit section 2 develops and executes various programs stored in advance in ROM 5, which is an Electrical Erasable Programmable Read-Only Memory (EEPROM) such as flash memory, by way of bus 21. Thus, the central processing unit 3 comprehensively controls the video camera 1 and executes various processes according to the various programs. Note that the central processing unit 3 can update any of the programs stored in the ROM 5 when it is connected to the outside by way of input/output interface 4.

With this arrangement, as a moving image pickup instruction is input from an operation section 12 according to the key operations performed by the user by way of the operation keys of the operation section 12 to pickup a moving image, a camera section (not shown) picks up a moving image of a subject to generate moving image data. The moving image data are prepared as video data of a plurality of frames that are temporally successive. The central processing unit 3 then generates a moving image stream from the moving image data by compression coding, using a moving image encoder (not shown), typically according to a compression coding system conforming to the Moving Picture Experts Group (MPEG) Standards.

Figure 2:
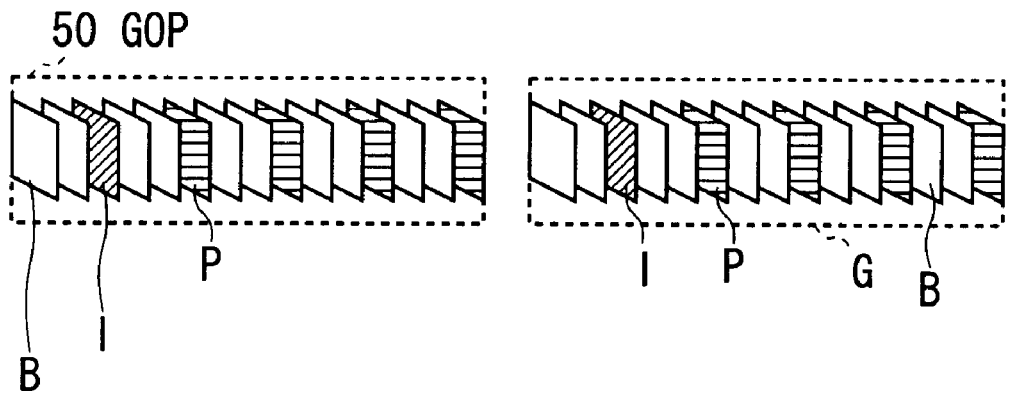
FIG. 2 is a schematic illustration of the MPEG2 picture structure.

Three picture types are defined by the MPEG Standards for processing moving image data by compression coding on frame image data by frame image data basis as shown in FIG. 2. Referring to FIG. 2, the three picture types include intra-frame coded images referred to as Intra (I) pictures (to be referred to as I frame images hereinafter), inter-frame forwardly predictively coded images referred to as Predictive (P) pictures (to be referred to as P frame images hereinafter) and bidirectionally predictively coded images referred to as Bidirectional (B) pictures (to be referred to as B frame images hereinafter). Additionally, four prediction modes are defined by the MPEG Standards. They include an intra-frame coding mode, a forward predictive coding mode, a backward predictive coding mode and a bidirectional predictive coding mode. Then, it is so defined that frame image data assigned to I frame images are compression-coded by intra-frame coding and frame image data assigned to P frame images are compression-coded by forward predictive coding, while frame image data assigned to B frame images are compression-coded by forward predictive coding, backward predictive coding or bidirectional predictive coding. Thus, the central processing unit 3 forms Groups of Pictures (GOPs) 50 by grouping a predetermined number of frames of moving images by means of an encoder and assigns the frame image data of each GOP 50 to I frame images, P frame images and B frame images in a predetermined order. Then, the central processing unit 3 processes the frame image data by compression coding according to the assigned picture types.

Additionally, the central processing unit 3 generates a sound stream by means of the moving image encoder by processing the sound data generated by collecting the surrounding sounds of the subject by means of a microphone (not shown) by a predetermined unit according to the MPEG Standards in parallel with the operation of picking up a moving image of the subject by means of the camera. Still additionally, the central processing unit 3 generates a program stream by time-division multiplexing the moving image stream and the sound stream and sends out the generated program stream to recording/reproduction section 8. Then, the central processing unit 3 records the program stream in the recording region of the optical disc 20 by means of recording/reproduction section 8 as data file.

Figure 3:
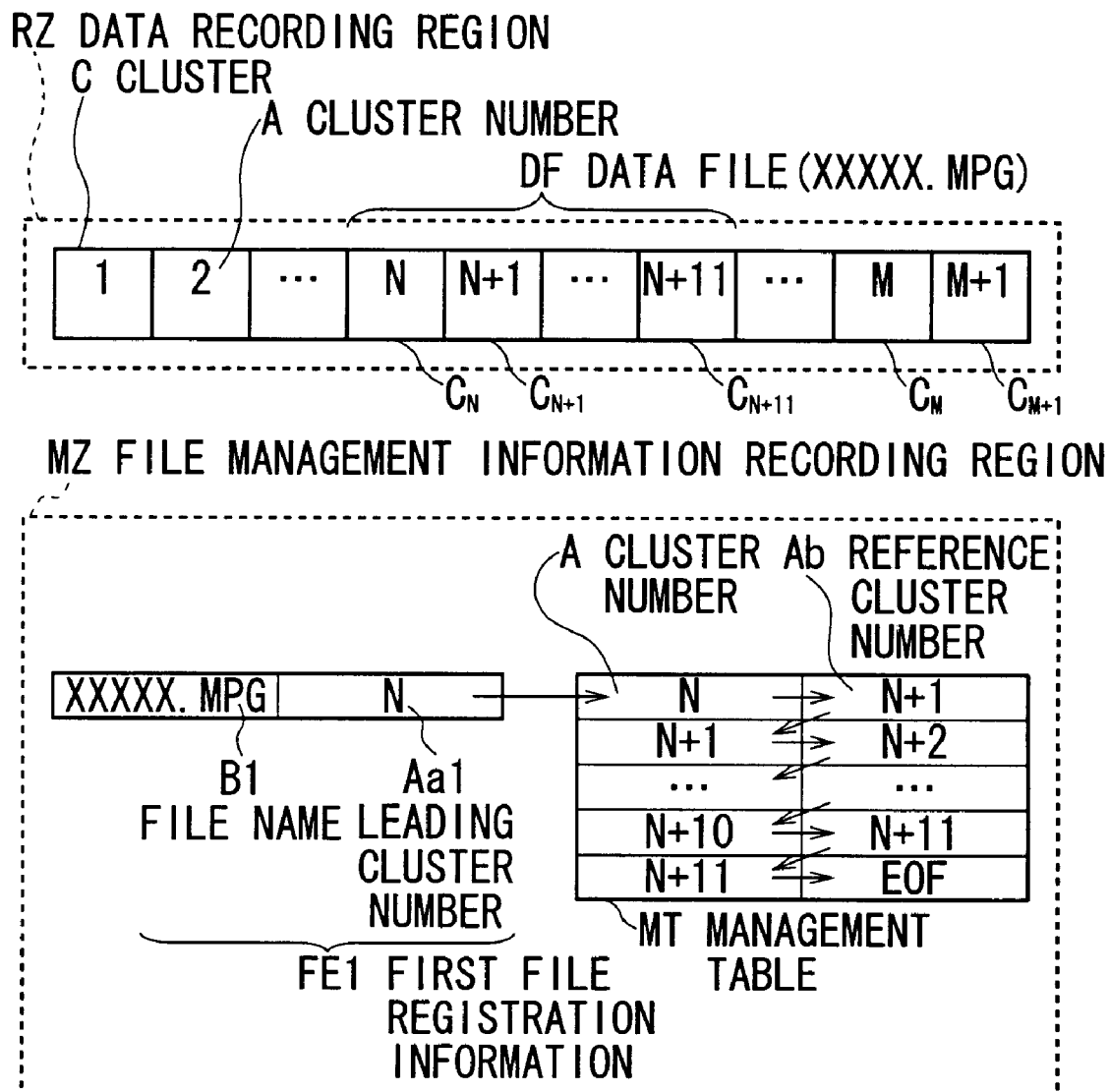
FIG. 3 is a schematic illustration of the file management of a FAT file system.

As shown in FIG. 3, the optical disc 20 is provided with a data recording region RZ for recording data files DF on the data recording surface and a file management information recording region MZ for recording file management information for managing the data files DF recorded in the data recording region RZ according to the FAT file system. The optical disc 20 is also provided with a plurality of clusters C in the data recording region RZ thereof and individually identifiable numbers (to be referred to as cluster numbers hereinafter) A are assigned to the clusters C. First file registration information FE1, which is referred to as file entry, can be recorded in the file management information recording region MZ and a management table MT that is referred to as FAT is recorded in the file management information recording region MZ. The cluster numbers A that correspond to all the clusters C in the data recording region RZ are listed and described in the management table MT lists, which management table MT is adapted to store the cluster numbers A for indicating the next reference positions (to be referred to as reference cluster numbers Ab hereinafter) in correspondence with the listed cluster numbers A.

When, for instance, data file DF is recorded over a plurality of clusters C in the data recording region RZ of the optical disc 20, the central processing unit 3 generates file registration information FE1 for registering the data file DF on the basis of the file name B1 of the data file DF recorded in the data recording region RZ. Additionally, the central processing unit 3 detects the cluster number A of the cluster CN recorded in the leading cluster recording part of the data file DF and stores it in the first file registration information FE1 as leading cluster number Aa1 and records the first file registration information FE1 in the file management information recording region MZ by means of the recording/reproduction section 8. Furthermore, the central processing unit 3 stores the reference cluster number Ab indicating the next reference position in the cluster C that is being used to record the data file DF by means of the recording/reproduction section 8 in a management table MT. Still additionally, when the cluster C is used to record the rear cluster recording part of the data file DF, the central processing unit 3 stores End Of File (EOF) as numerical value indicating the end of the file.

With this arrangement, as a moving image reproduction instruction is input from the operation section 12 in response to a key operation, the central processing unit 3 reads out the first file registration information FE1 that corresponds to the data file DF in question from the file management information recording region MZ of the optical disc 20 by means of the recording/reproduction section 8. Then, the central processing unit 3 detects the cluster C where each cluster recording part of the data file DF is recorded, sequentially following the cluster numbers A and the reference cluster numbers Ab in the management table MT, on the basis of the leading cluster number Aa1 of the first file registration information FE1 and sequentially reads out the cluster recording parts recorded in the cluster C so as to read out the entire data file DF from the data recording region RZ by means of the recording/reproduction section 8.

Thereafter, the central processing unit 3 sends out the program stream it reads out to separation/decoding section 10 by means of reproduction work memory 9. The separation/decoding section 10 separates the moving image stream and the sound stream from each other out of the program stream. Then, the separation/decoding section 10 decodes the moving image stream by every GOP 50 to generate moving image data and sends out the generated moving image data to output signal processing section 11. Additionally, the separation/decoding section 10 decodes the sound stream by a predetermined unit to generate sound data and sends out the generated sound data to the output signal processing section 11. The output signal processing section 11 sends out the moving image data to display section 13 to have it display a moving image according to the moving image data and also the sound data to a speaker (not shown) to output sounds from the speaker according to the sound data in synchronism with the moving image being displayed on the display section 13.

When the central processing unit 3 is displaying a moving image on the display section 13 and if a file splitting instruction is input from the operation section 12 according to the key operations performed by way of the operation keys to slit the data file DF that corresponds to the moving image being displayed, the central processing unit 3 starts splitting the data file DF recorded in the data recording region RZ into a front side first split data file and a rear side second split data file as viewed from a predetermined file splitting position.

As a matter of fact, the central processing unit 3 is sequentially switching a plurality of frames of the moving image so as to consequently display the moving image. Additionally, when the central processing unit 3 reads out the data file DF from the data recording region RZ as program stream, it checks the head information of the GOP 50 in the moving image stream contained in the program stream by time-division multiplexing and detects the frame image data at the front end of the GOP 50 (to be referred to as leading frame image data hereinafter), while it identifies the boundary of the GOPs 50 that are candidates for the file splitting position (to be referred to as GOP boundary hereinafter) from the detected leading frame image data. Furthermore, the central processing unit 3 sequentially detects the cluster numbers A of the clusters C (to be referred to as GOP boundary cluster numbers hereinafter) for recording the cluster recording parts including the GOP boundaries 60 of the data file DF (to be referred to as GOP boundary cluster numbers hereinafter) and sends out the detected GOP boundary cluster numbers to editing work memory 7 to record them there.

With this arrangement, the central processing unit 3 detects the time code added to the frame image data of the frame image that is being displayed when the file splitting instruction is input and compares the time code added to the detected frame image data with the time code of the leading frame image data of each of the GOPs 50 located at the rear side of each of the GOP boundaries 60 included in the respective GOP boundary recording parts corresponding to the plurality of GOP boundary cluster numbers stored in the editing work memory 7. Then, as the central processing unit 3 detects the leading frame image data having the time code closest to the time code of the frame image data, it identifies the GOP boundary cluster number that corresponds to the detected leading frame image data. At this time, the central processing unit 3 detects the GOP boundary 60 included in the GOP boundary recording part that corresponds to the identified GOP boundary cluster number as the file splitting position D for splitting the data file DF, the GOP boundary recording part that includes the file splitting position D as splitting position cluster recording part R and also the cluster number A that corresponds to the splitting position cluster recording part R as file splitting cluster number AP. Then, the central processing unit 3 reads out the detected file splitting cluster number AP from the editing work memory 7.

As shown in FIGS. 4A and 4B, the central processing unit 3 detects the splitting position cluster recording part R recorded in the cluster $C_N$ that corresponds to the file splitting cluster number AP (to be also referred to specifically as file splitting cluster hereinafter) and reads it out from the data recording region RZ. Then, the central processing unit 3 stores the read out splitting position cluster recording part R in the editing work memory 7. Additionally, the central processing unit 3 detects the empty cluster $C_M$ that is closest to the file splitting cluster $C_N$ from the management table MT. Then, the central processing unit 3 reads out the splitting position cluster recording part R from the editing work memory 7 and records the read out splitting position cluster recording part R in the empty cluster $C_M$ by means of the recording/reproduction section 8. In short, the central processing unit 3 copies the splitting position cluster recording part R that includes the file splitting position D recorded in the file splitting cluster $C_N$ to the empty cluster $C_M$ that is closest to the file splitting cluster $C_N$.

Then, the central processing unit 3 generates second file registration information FE2 for storing the file name B2 for the second split data file that is automatically generated on the basis of the file name B1 of the data file DF. Additionally, the central processing unit 3 detects the cluster number A of the cluster $C_M$ for recording the splitting position cluster recording part R after the copying (the leading cluster recording part of the second split data file) and stores it in the second file registration information FE2 as leading cluster number Aa2. Then, the central processing unit 3 records the second file registration information FE2 in the file management information recording region MZ so as to be used for registering the second split data file by means of the recording/reproduction section 8.

Furthermore, the central processing unit 3 reads out the reference cluster number Ab (which is N+1 in this case) of the cluster number A (which is N in this case) that corresponds to the file splitting cluster $C_N$ where the splitting position cluster recording part R before the copying is recorded out of the cluster numbers A listed and stored in the management table MT and copies the cluster number A (which is M in this case) that corresponds to the cluster $C_M$ where the splitting position cluster recording part R after the copying is recorded to the reference cluster number Ab. In short, the central processing unit 3 alters the reference cluster number Ab of the cluster $C_M$ so as to connect the splitting position cluster recording part R before the copying to the cluster recording part next to the splitting position cluster recording part R after the copying.

On the other hand, the central processing unit 3 uses the first file registration information FE1 used for registering the data file DF before the splitting for the purpose of registering the first split data file. Additionally, the central processing unit 3 rewrites the reference cluster number Ab of the cluster number A that corresponds to the file splitting cluster $C_N$ where the splitting position cluster recording part R before the copying is recorded out of the cluster numbers A listed and stored in the management table MT as the EOF showing the numerical value that indicates the end of the file, In other words, the central processing unit 3 alters the reference cluster number A of the file splitting cluster $C_N$ so as to bring the splitting position cluster recording part R before the copying to the tail end of the first split data file.

In this way, when executing a file splitting process, the central processing unit 3 splits the data file DF recorded in the data recording region RZ into the first split data file where data are recorded in the clusters $C_S$, $C_{S+1}$, $C_{S+2}$, $C_{S+3}$, $C_{S+4}$, $C_{S+5}$, $C_{S+6}$ and $C_N$ that are identified by tracing the cluster numbers A and the reference cluster numbers Ab of the management table MT in the order of S, S+1, S+2, S+3, S+4, S+5, S+6 and N on the basis of the leading cluster number Aa1 of the file registration information FE1 and the second split data file where data are recorded in the clusters $C_M$, $C_{N+1}$, $C_{N+2}$, . . . that are identified by tracing the cluster numbers A and the reference cluster numbers Ab of the management table MT in the order of M, N+1, N+2, . . . on the basis of the leading cluster number Aa2 of the file registration information FE2.

(1-2) File Splitting Process Sequence

Figure 5:
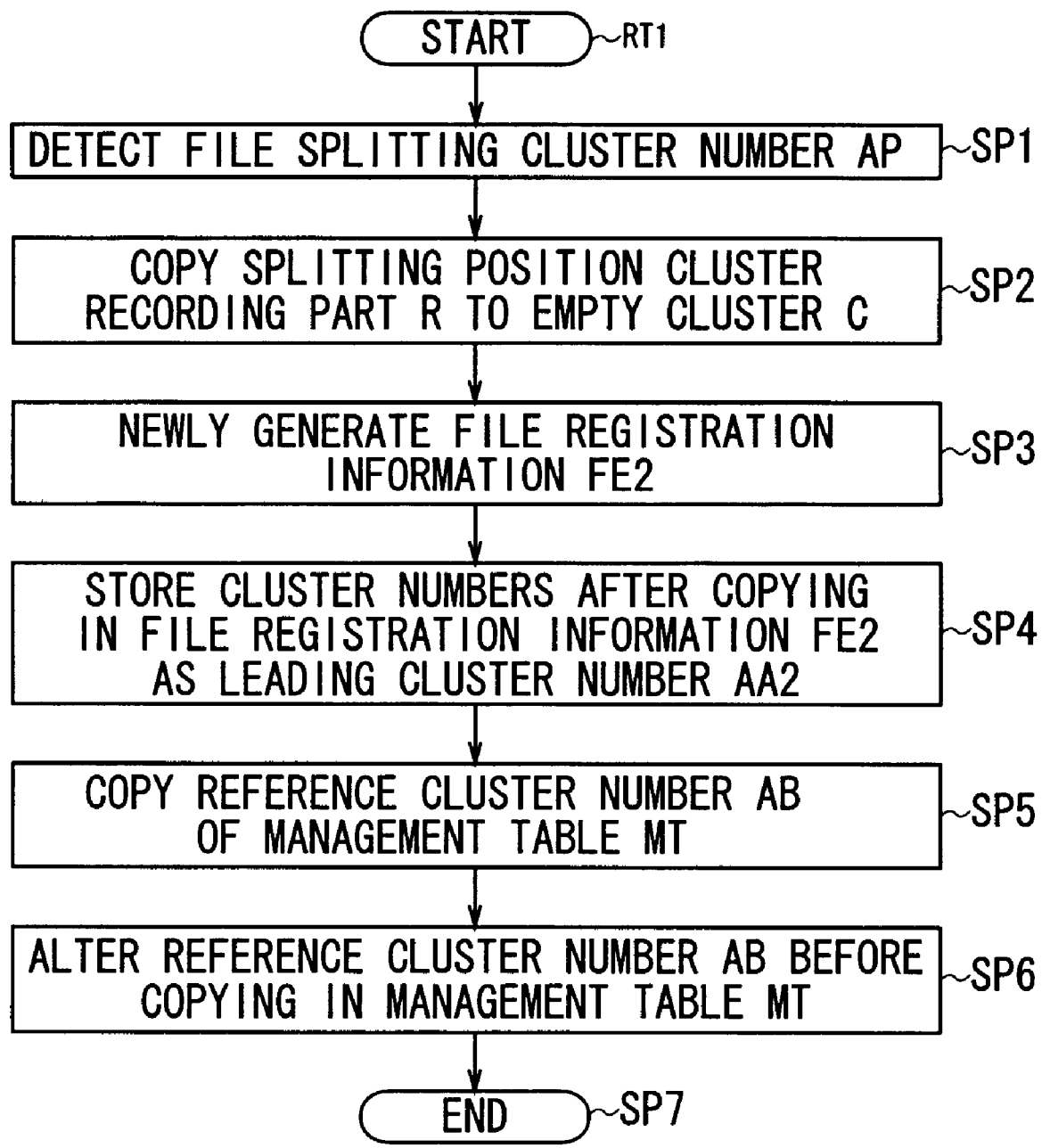
FIG. 5 is a flowchart of the file splitting process sequence according to the first embodiment of the present invention.

As a file splitting instruction is input while a moving image is being displayed, the central processing unit 3 starts the file splitting process sequence RT1 as shown in FIG. 5. As the central processing unit 3 starts the file splitting process sequence RT1, it detects the file splitting cluster number AP that corresponds to the leading frame image data having the time code closest to the time code added to the frame image data of the frame image that is being displayed when the file splitting instruction is input out of the GOP boundary cluster numbers stored in the editing work memory 7 in Step SP1 and then moves to the next step, or Step SP2.

In Step SP2, the central processing unit 3 copies the splitting position cluster recording part R recorded in the file splitting cluster $C_N$ that corresponds to the file splitting cluster number AP to the empty cluster $C_M$ and then moves to the next step, or Step SP3.

In Step SP3, the central processing unit 3 generates the second file registration information FE2 for storing the newly generated file name B2 and then moves to the next step, or Step SP4.

In Step SP4, the central processing unit 3 detects the cluster number A of the cluster $C_M$ where the splitting position cluster recording part R before the copying is recorded and stores the detected cluster number A in the second file registration information FE2 as leading cluster number Aa2 before it moves to the next step, or Step SP5.

In Step SP5, the central processing unit 3 copies the reference cluster number Ab of the cluster number A that corresponds to the file splitting cluster $C_N$ where the splitting position cluster recording part R before the copying is recorded out of the cluster numbers A stored in the management table MT to the reference cluster number Ab of the cluster number A that corresponds to the cluster $C_M$ where the splitting position cluster recording part R after the copying is recorded and then moves to the next step, or Step SP6.

In Step SP6, the central processing unit 3 rewrites the reference cluster number Ab of the cluster number A that corresponds to the file splitting cluster $C_N$ where the splitting position cluster recording part R before the copying is recorded out of the cluster numbers A stored in the management table MT to EOF and then moves to the next step, or Step SP7, where it ends the file splitting process sequence RT1.

Thus, by means of the file splitting process sequence RT1, the video camera 1 splits the data file DF recorded in the data recording region RZ of the optical disc 20 into the first split data file and the second split data file.

(1-3) Operation and Advantages of First Embodiment

When a file splitting instruction is input to the video camera 1 having the above-described configuration while a moving image is being displayed, the video camera 1 detects the file splitting cluster number AP for identifying the cluster C that includes the file splitting position D. Then, it also detects the splitting position cluster recording part R recorded in the file splitting cluster $C_N$ that corresponds to the file splitting cluster number AP and copies the splitting position cluster recording part R to the empty cluster $C_M$ located closest to the file splitting cluster $C_N$. Additionally, the video camera 1 alters the reference cluster number Ab of the cluster $C_M$ so as to connect the splitting position cluster recording part R after the copying to the cluster recording part next to the splitting position cluster recording part R before the copying and also alters the reference cluster number Ab of the file splitting cluster $C_N$ so as to bring the splitting position cluster recording part R before the copying to the tail end of the first split data file.

Thus, when the video camera 1 splits the data file DF recorded in the data recording region RZ of the recording medium at a file splitting position D, it can do so simply by coping the splitting position cluster recording part R that includes the file splitting position D to an empty cluster $C_M$ and altering the reference cluster number Ab of the file splitting cluster $C_N$ where the splitting position cluster recording part R before the copying is recorded and the reference cluster number Ab of the cluster $C_M$ where the splitting position cluster recording part R after the copying is recorded.

With the above-described arrangement, when the video camera 1 splits the data file DF recorded in the data recording region RZ over a plurality of clusters C at a predetermined file splitting position, it detects the splitting position cluster recording part R that includes the file splitting position D out of the plurality of cluster recording parts of the data file DF recorded over a plurality of clusters C, copies the detected splitting position cluster recording part R to some other cluster C in the data recording region RZ and alters the reference cluster number Ab of the management table MT so as to manage the first split data file and the second split data file obtained by dividing the data file DF at the file splitting position D and also alters the reference cluster number Ab of the management table MT so as to make the splitting position cluster recording part R before the copying and the splitting position cluster recording part R after the copying respectively part of the first split data file and part of the second split data file. Thus, when the video camera 1 splits the data file DF recorded in the data recording region RZ of the recording medium, it can do so simply by coping the splitting position cluster recording part R that includes the file splitting position D to some other cluster C and altering the reference cluster number Ab in the management table MT. Thus, it is possible to simplify the process of splitting a recorded data file.

Additionally, when a data file DF is recorded in the data recording region RZ, the video camera 1 generates first file registration information FE1 for registering the data file DF that is made to correspond to the cluster number A in the management table MT by means of the cluster C where the leading cluster recording part of the data file DF is recorded and, when the data file DF is split at a file splitting position D, the video camera 1 generates second file registration information FE2 for registering the second split data file that is made to correspond to the cluster number A in the management table MT by means of some other cluster C where the splitting position cluster recording part R that includes the file splitting position D is copied, using the first file registration information to register the first split data file. Thus, although the video camera 1 splits a data file DF into two new files, it is only required to generate information for registering one of the two new files and uses the information for registering the original data file RD as information for registering the other new file so that it is possible to reduce the number of times of writing information in the file management information recording region MZ and hence the number of times of registering new files when splitting a file.

(2) Second Embodiment

Figure 6:
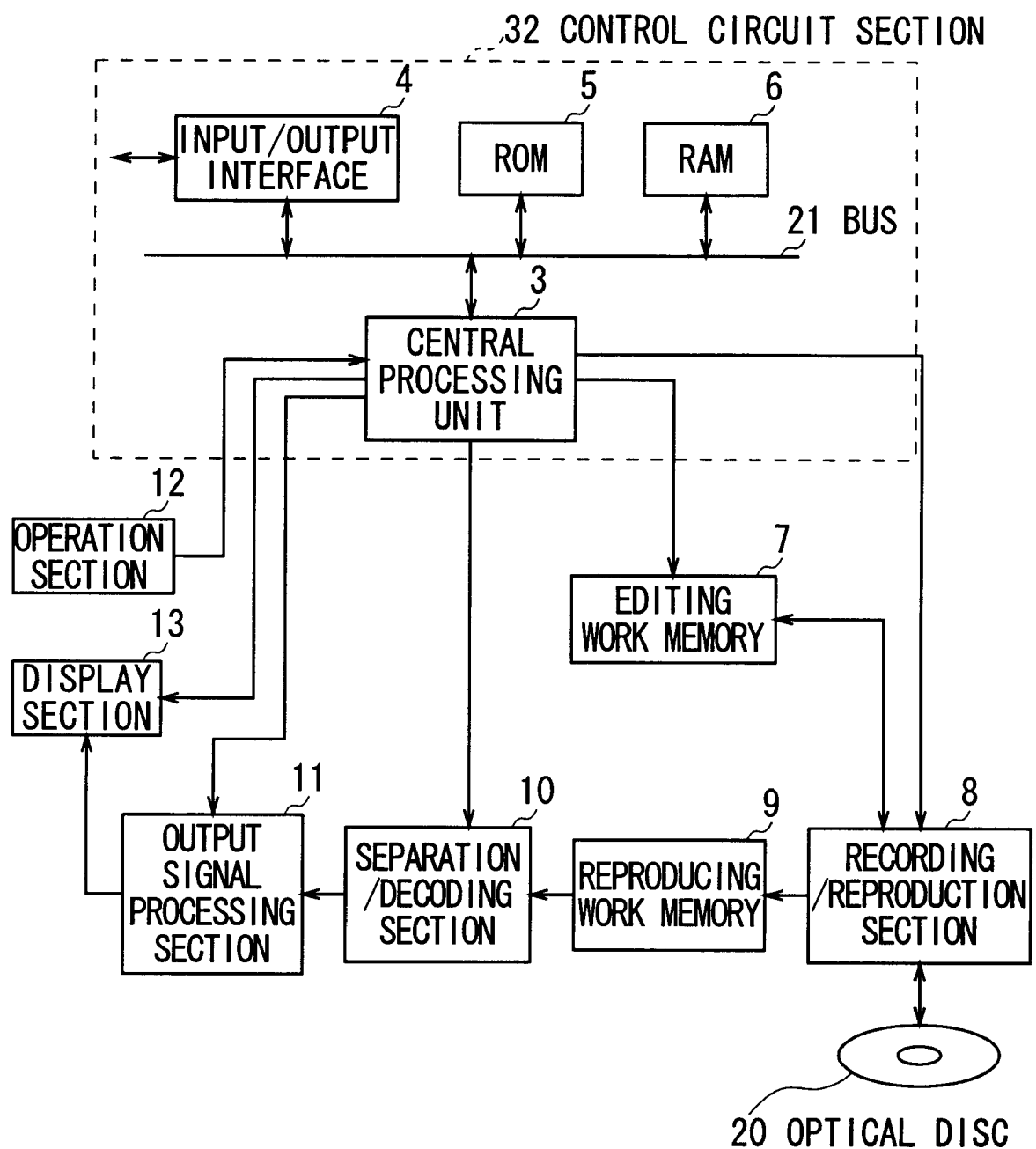
FIG. 6 is a schematic block diagram according to a second embodiment of the present invention, which is a video camera, showing the circuit configuration thereof.

FIG. 6 shows a video camera 31 according to a second embodiment of the present invention. In FIG. 6, the components same as or similar to those of FIG. 1 are denoted respectively by the same reference symbols. Referring to FIG. 6, the video camera 31 has a configuration same as the above-described first embodiment except a central processing unit 33 arranged in a control circuit section 32.

When the central processing unit 33 reads out the splitting position cluster recording part R recorded in the cluster C that corresponds to a file splitting cluster number AP at the time of splitting a file, it compares the time code of the splitting position cluster recording part R and the time code of the leading frame image data of the GOP 59 located rearward relative to the GOP boundary 60 of the file splitting position D included in the splitting position cluster recording part R to determine if the leading frame image data of the rear side GOP 50 is located at the head of the splitting position cluster recording part R or not. If it is determined that the leading frame image data is not located at the head of the splitting position cluster recording part R, the central processing unit 33 executes a process same as the one described above for the first embodiment. If, on the other hand, it is determined that the leading frame image data is located at the head of the splitting position cluster recording part R, it means that the file splitting position D agrees with the boundary of clusters C (to be referred to as cluster boundary hereinafter) and hence the central processing unit 33 executes a file splitting process of splitting the data file DF at the cluster boundary.

In such a file splitting process, the central processing unit 33 typically generates file registration information FE3 storing the file name B3 of the second split data file that is automatically generated on the basis of the file name B1 of the data file DF. Additionally, the central processing unit 33 detects the cluster number A of the cluster C where the splitting position cluster recording part R (to be referred to also as split file leading recording part) is recorded as split file leading number and stores it in the file registration information FE3 as leading cluster number Aa3. Then, the central processing unit 33 records the file registration information FE3 in the file management information recording region MZ by means of the recording/reproduction section 8. Furthermore, the central processing unit 33 detects the cluster number A of the cluster C where the split file leading recording part is recorded out of the cluster numbers A listed and stored in the management table MT as reference cluster number Ab as the split file tail end number of the first split data file, and replaces the reference cluster number Ab that corresponds to the tail end number of the detected split file with EOF, or the numerical value indicating the end of the file.

In this way, when the central processing unit 33 splits a file and the file splitting position D agrees with the a cluster boundary, it splits the data file DF recorded in the data recording region RZ into a first split data file from the leading cluster recording part of the data file DF to the cluster recording part that is recorded in the cluster C corresponding the split file tail end number and a second split data file from the split file leading recording part of the cluster C corresponding the leading cluster number Aa3 of the file registration information FE3 (or the split file leading number) to the cluster recording part at the tail end of the data file DF and ends the file splitting process.

Figure 7:
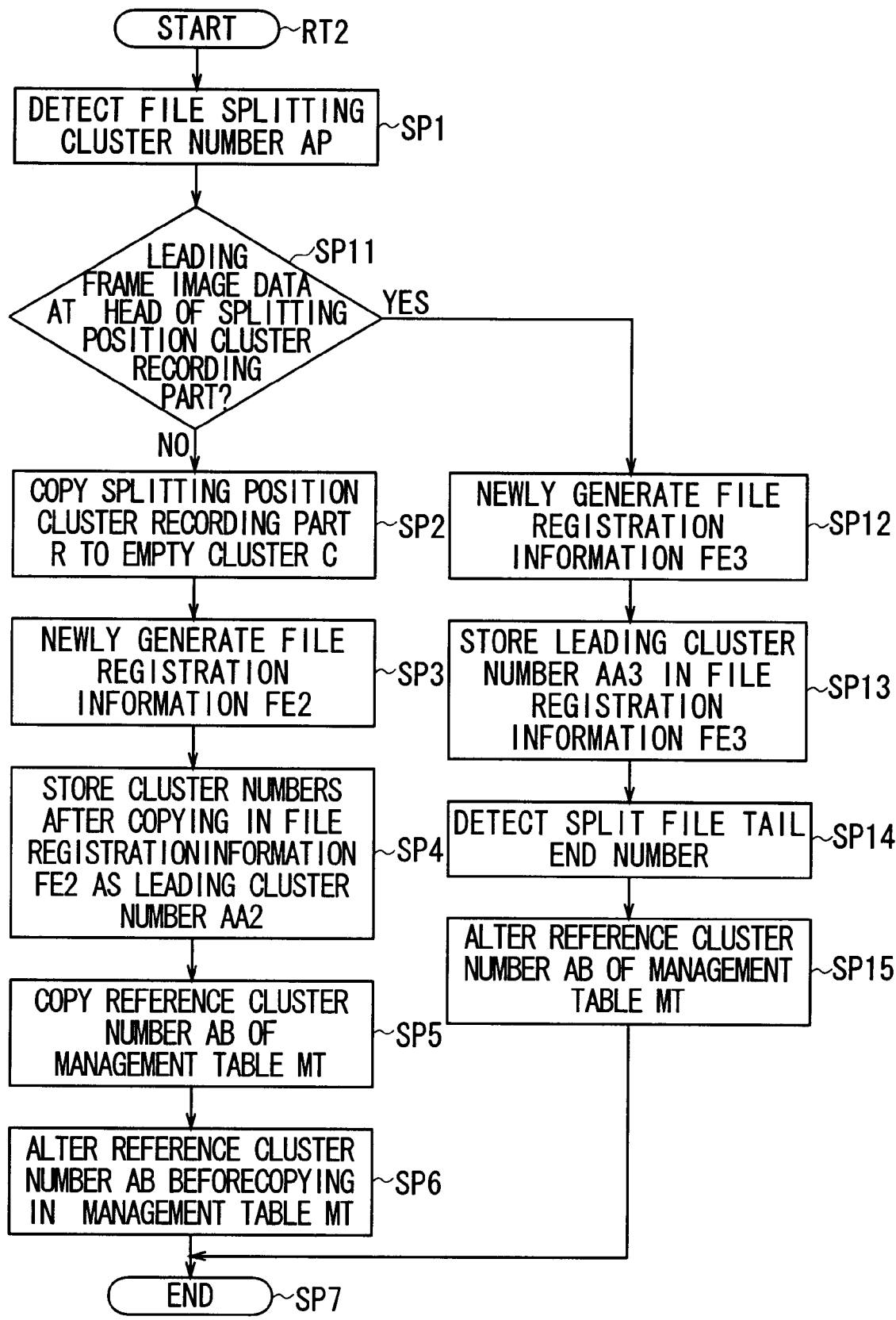
FIG. 7 is a flowchart of the file splitting process sequence according to the second embodiment of the present invention.

As a file splitting instruction is input while a moving image is being displayed, the central processing unit 33 starts the file splitting process sequence RT2 as shown in FIG. 7, where the components same as those of FIG. 5 are denoted respectively by the same reference symbols. As the central processing unit 33 starts the file splitting process sequence RT2, it carries out the processing operation of Step SP1 that is same as the corresponding step of the file splitting process sequence RT1 and then moves to Step SP11.

In Step SP11, the central processing unit 33 determines if the leading frame image data of the GOP 50 that is located at the rear side relative to the file splitting position D is at the leading position of the splitting position cluster recording part R or not. If the answer to the question at Step SP11 is negative, it means that the file splitting position D does not agree with the cluster boundary. Therefore, then the central processing unit 33 moves to Step SP2 and sequentially carries out the processing operations of Step SP2 through SP6 and moves to Step SP7 to end the file splitting process sequence RT2 as in the case of the above-described file splitting process sequence RT1 in the first embodiment.

If, on the other hand, the answer to the question at Step SP11 is affirmative, it means that the file splitting position D agrees with the cluster boundary. Therefore, the central processing unit 33 moves to Step SP12.

In Step SP12, the central processing unit 33 generates file registration information FE3 storing the newly generated file name B3 and moves to the next step, or Step SP13.

In Step SP13, the central processing unit 33 detects the cluster number A of the cluster C where the split file leading recording part is recorded as the split file leading number and stores it in the file registration information FE3 as leading cluster number Aa3 before it moves to the next step, or Step SP14.

In Step SP14, the central processing unit 33 detects the cluster number A stored in the management table MT of the cluster C where the split file leading recording part is recorded as reference number Ab for the split file tail end number and moves to the next step, or Step SP15.

In Step SP15, the central processing unit 33 replaces the reference cluster number Ab that corresponds to the tail end number of the detected split file with EOF, or the numerical value indicating the end of the file and moves to the next step, or Step SP7 and then ends the file splitting process sequence RT2.

Thus, by means of the file splitting process sequence RT2, the video camera 31 splits the data file DF recorded in the data recording region RZ of the optical disc 20.

As described above, when the video camera 31 executes a file splitting process, it determines if the leading frame image data of the GOP 50 that is found at the rear side relative to the file splitting position D is located at the leading end of the splitting position cluster recording part R or not. If it is determined that the leading frame image data is located at the leading end of the splitting position cluster recording part, the video camera 31 generates file registration information FE3 storing the newly generated file name B3, detects the cluster number A of the cluster C where the split file leading recording part is recorded as split file leading number and stores the detected split file leading number as leading cluster number Aa3. Additionally, the video camera 31 detects the cluster number A stored in the management table MT as reference cluster number Ab of the cluster C where the split file leading recording part is recorded and stores the EOF there, overwriting it as the numerical value indicating the end of the file.

Therefore, when the video camera 31 splits a data file DF recorded in the data recording region RZ at a file splitting position D, it can split the data file DF simply by altering the reference cluster number Ab in the management table MT without copying the split file leading recording part to some other cluster C when the file splitting position D and the cluster boundary agree with each other.

Thus, with the above-described arrangement, when the video camera 31 splits a data file DF recorded in the data recording region RZ at a file splitting position D, it determines if the file splitting position D is on the cluster boundary or not and, if it is determined that the file splitting position D is on the cluster boundary, the video camera 31 does not copy the splitting position cluster recording part R to some other cluster C. Then, as a result, when the video camera 31 splits a data file DF recorded in the data recording region RZ at a file splitting position D and the file splitting position D and the cluster boundary agree with each other, the video camera 31 is not required to copy the split file leading recording part to some other cluster C and can split the data file DF simply by altering the reference cluster number Ab in the management table MT. In this way, the video camera 31 can accurately execute the file splitting process according to the file splitting position D of the data file DF.

(3) Third Embodiment

Figure 8:
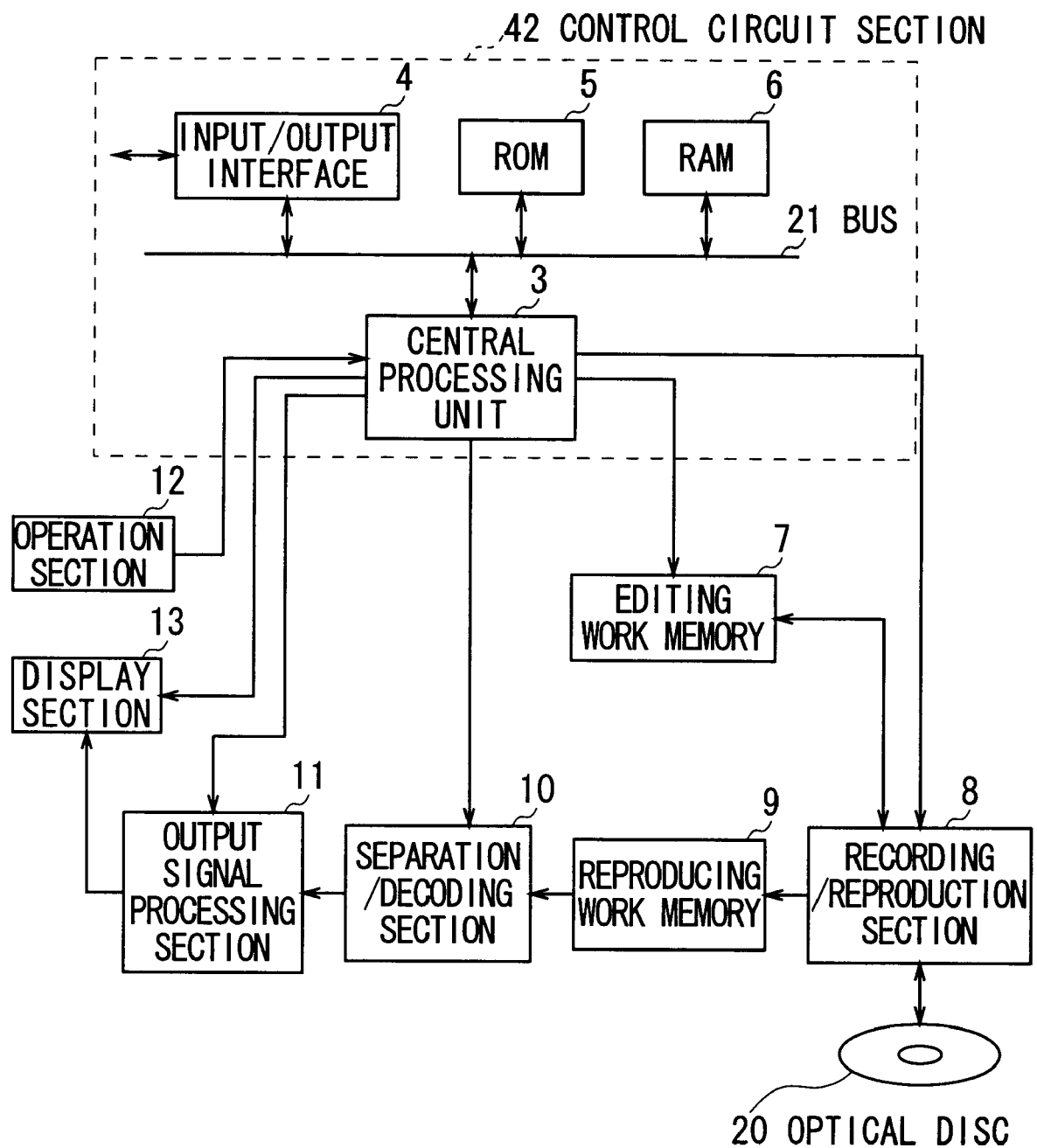
FIG. 8 is a schematic block diagram according to a third embodiment of the present invention, which is a video camera, showing the configuration thereof.

FIG. 8 shows a video camera 41 according to a third embodiment of the present invention. In FIG. 8, the components same as or similar to those of FIG. 6 are denoted respectively by the same reference symbols. Referring to FIG. 8, the video camera 41 has a configuration same as the above-described second embodiment except a central processing unit 43 arranged in a control circuit section 42.

When the central processing unit 43 splits a data file DF into a first split data file and a second split data file in a file splitting process, it detects the splitting position cluster recording part R before the copying that is contained at the tail end of the first split data file by means of the recording/reproduction section 8 and overwrites the part of the detected splitting position cluster recording part R located at the rear side of the file splitting position D in the splitting position cluster recording part R with dummy data such as "0".

On the other hand, when the central processing unit 43 splits the data file DF into a first split data file and a second split data file in a file splitting process, it detects the splitting position cluster recording part R after the copying that is contained at the head of the second split data file by means of the recording/reproduction section 8 and overwrites the part of the detected splitting position cluster recording part R located at the front side of the file splitting position D in the splitting position cluster recording part R.

Figure 9:
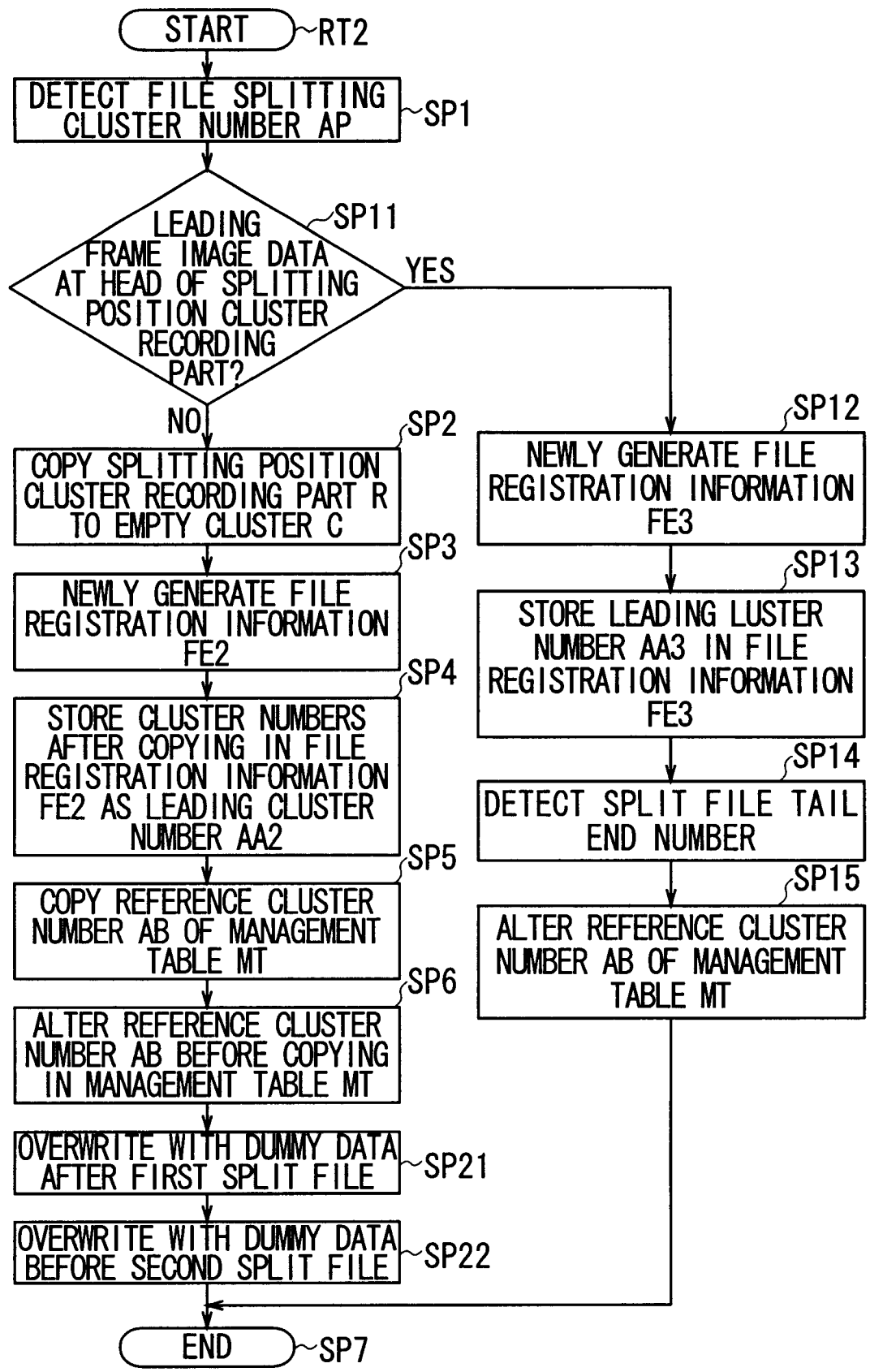
FIG. 9 is a flowchart of the file splitting process sequence according to the third embodiment of the present invention.

As a file splitting instruction is input while a moving image is being displayed, the central processing unit 43 starts the file splitting process sequence RT3 as shown in FIG. 9, where the components same as those of FIG. 7 are denoted respectively by the same reference symbols. As the central processing unit 43 starts the file splitting process sequence RT3, it carries out the processing operations of Steps SP1 through SP6 that are same as the corresponding steps of the above-described file splitting process sequence RT2 in the first embodiment and then moves to Step SP21.

In step SP21, the central processing unit 43 overwrites the part of the splitting position cluster recording part R before the copying located at the rear side of the file splitting position D in the tail end of the first split data file with dummy data and moves to the next step, or Step SP22.

In Step SP22, the central processing unit 43 overwrites the part of the splitting position cluster recording part R after the copying located at the front side of the file splitting position D in the second split data file with dummy data and moves to the next step, or Step SP7, to end the file splitting process sequence RT3.

In this way, the video camera 41 splits the data file DF recorded in the data recording region RZ of the optical disc 20 according to the file splitting process sequence RT3.

With the above-described arrangement, when the video camera 41 splits a data file DF into a first split data file and a second split data file in the file splitting process, it overwrites the part of the splitting position cluster recording part R before the copying located at the rear side of the file splitting position D and contained at the tail end of the first split data file with dummy data and, at the same time, overwrites the part of the splitting position cluster recording part R after the copying located at the front side of the file splitting position D and contained at the head of the second split data file.

In short, when the video camera 41 splits the data file DF at a file splitting position D that is found midway of a cluster recording part, the first split data file contains the first split program stream obtained by splitting the program stream, which is originally managed as data file DF, at the file splitting position D and also part of the second split program stream. However, the video camera 41 overwrites the part of the splitting position cluster recording part R before the copying that is contained at the tail end of the first split data file and located at the rear side of the file splitting position D with dummy data so that it can delete the part of the second split program stream contained in the first split data file, leaving the first split program stream contained in the first split data file intact.

Additionally, when the video camera 41 splits a data file DF at a file splitting position D that is found midway of a cluster recording part, the second split data file contains the second split program stream obtained by dividing the program stream, which is originally managed as data file DF, at the file splitting position D and also part of the first split program stream. However, the video camera 41 overwrites the part of the splitting position cluster recording part R after the copying that is contained at the head of the second split data file and located at the front side of the file splitting position D with dummy data so that it can delete the part of the first split program stream contained in the second split data file, leaving the second split program stream contained in the second split data file intact.

Thus, with the above-described arrangement, the video camera 41 records the cluster C where the splitting position cluster recording part R before the copying that is now part of first split data file, overwriting the part where the data of the second split data file is left with dummy data, and at the same time records the other cluster C where the splitting position cluster recording part R after the copying that is now part of the second split data file, overwriting the part where the data of the first split data file is left with dummy data. Then, as a result, the video camera 41 can delete part of the second split program stream contained in the first split data file and also the part of the first split program stream contained in the second split data file so that it can properly reproduce the first split program stream so as to be managed in the first split data file and also the second split program stream so as to be managed in the second split data file when it reproduces the first split data file and the second split data file.

(4) Fourth Embodiment

Figure 10:
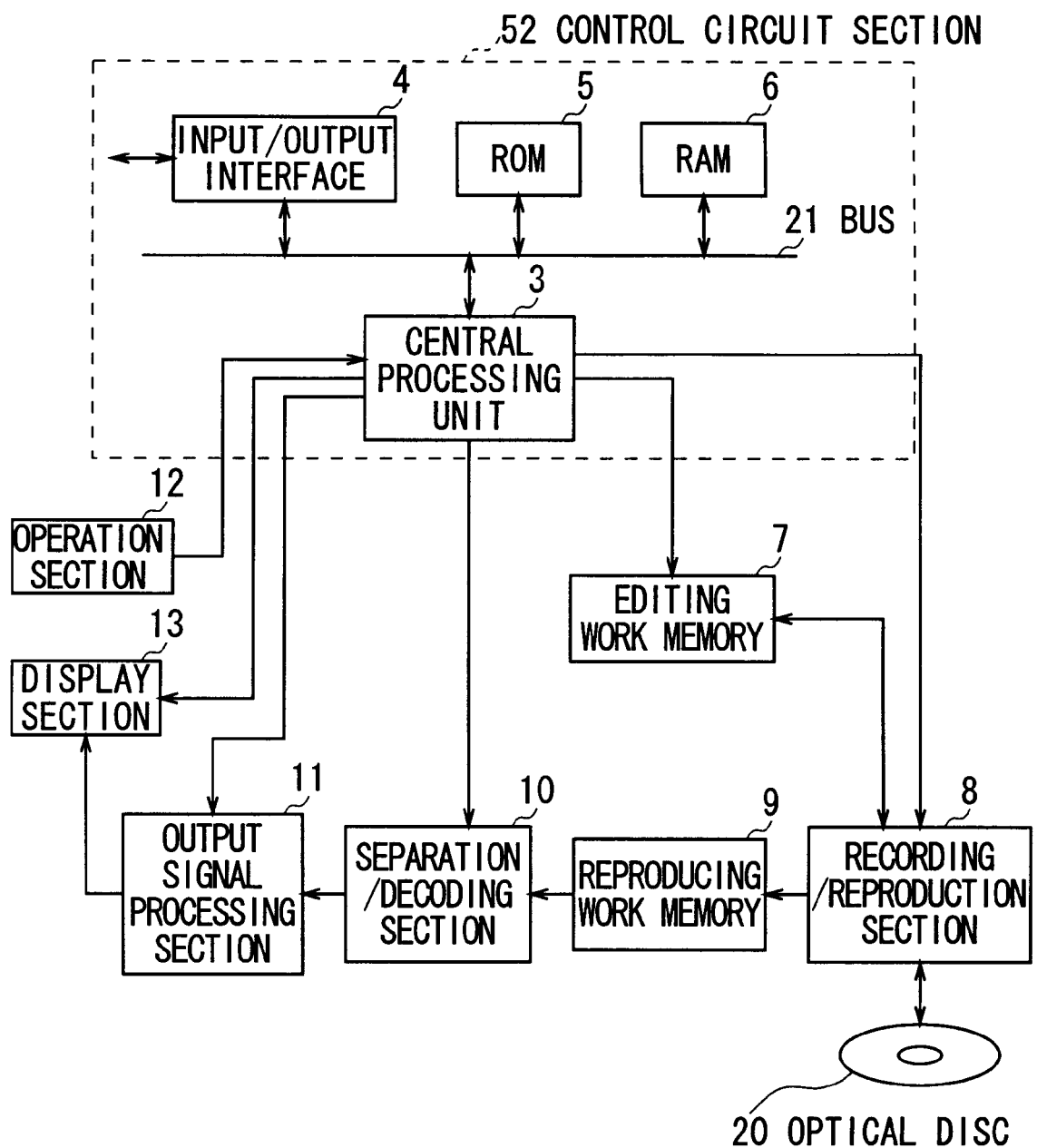
FIG. 10 is a schematic block diagram according to a fourth embodiment of the present invention, which is a video camera, showing the circuit configuration thereof.
Figure 12A:
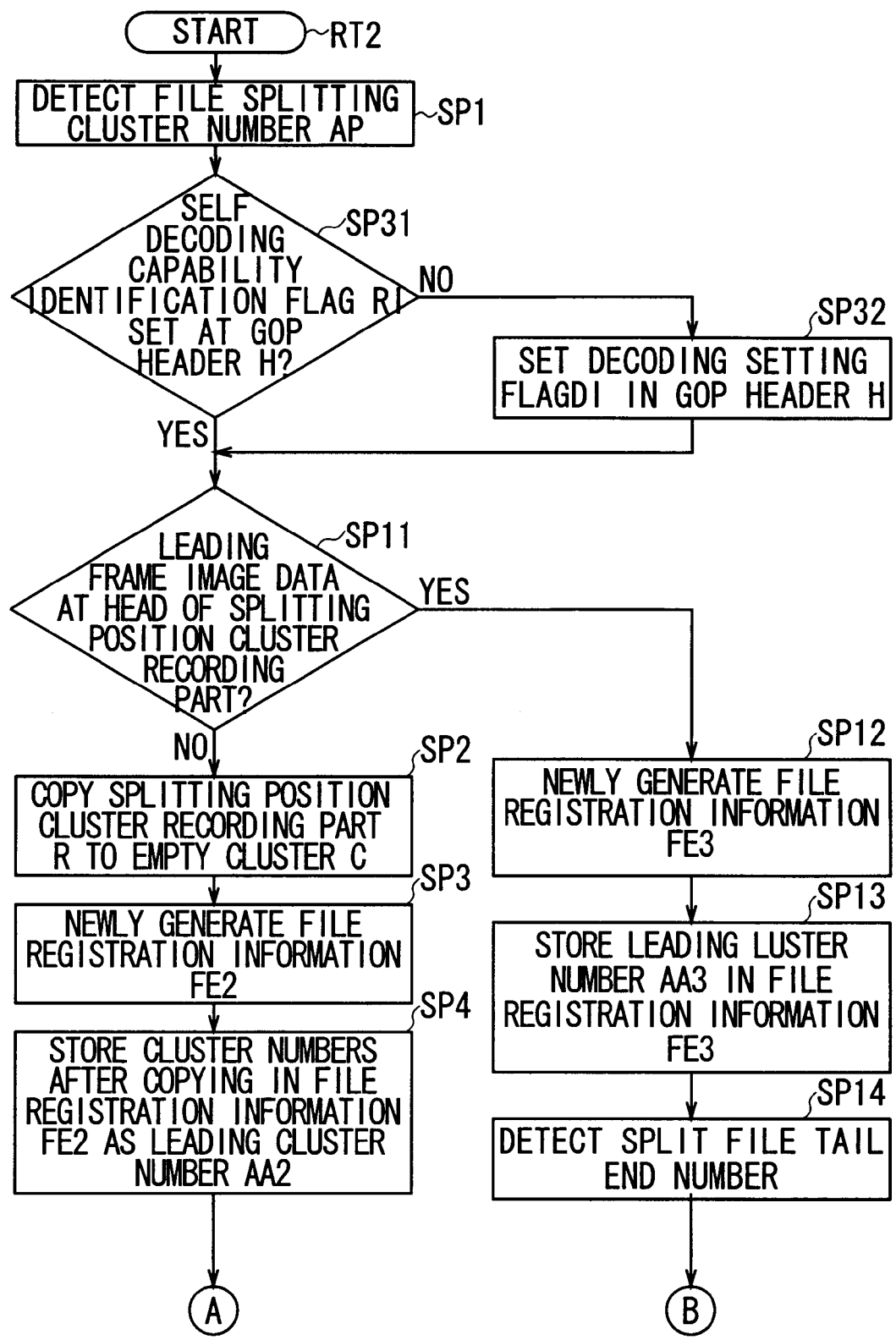
FIG. 12 is a flowchart of the file splitting process sequence according to the fourth embodiment of the present invention.
Figure 12B:
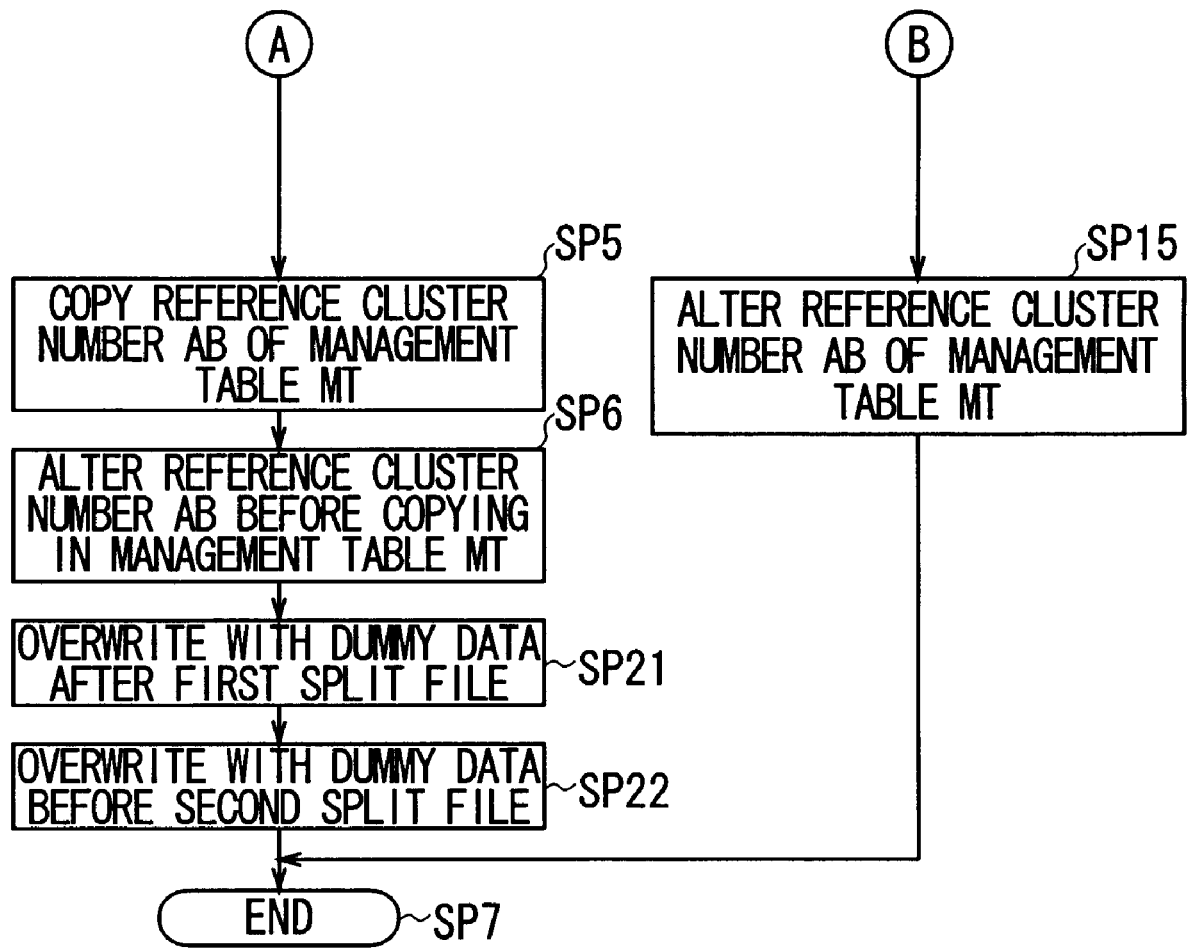
Figures 13A, 13B:
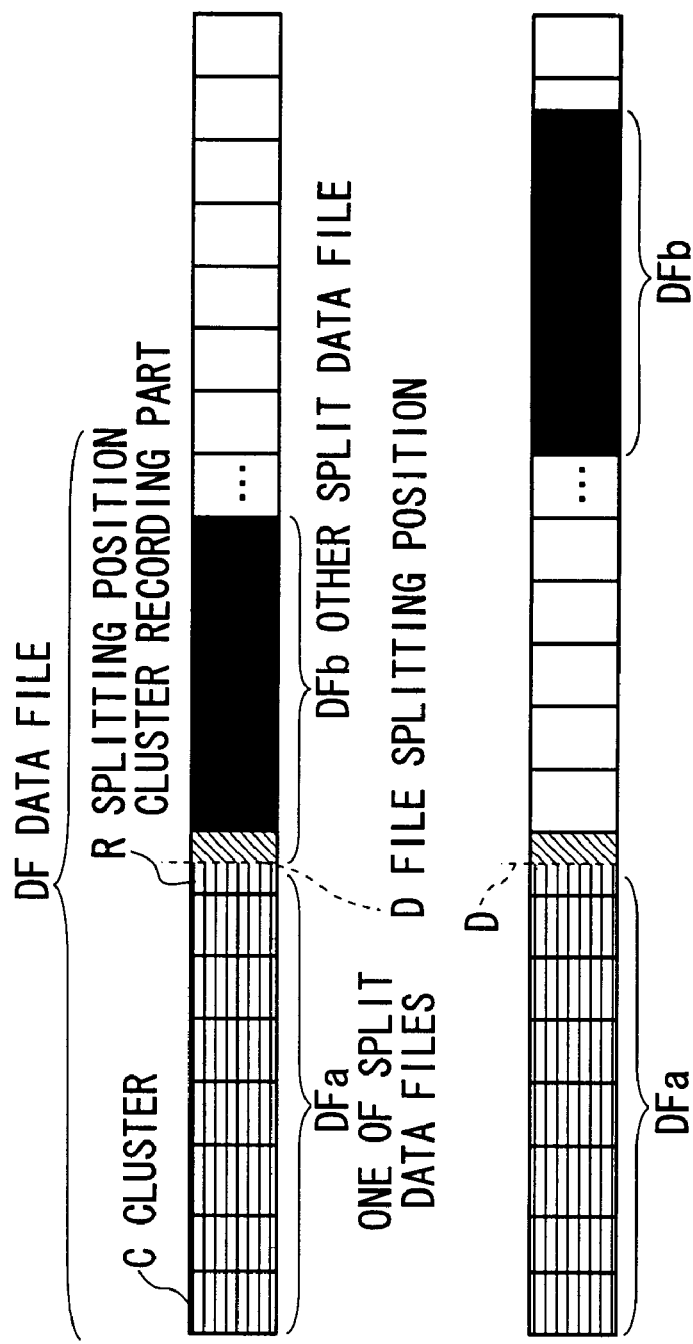
FIGS. 13A and 13B are schematic illustrations of a known file splitting process.

FIG. 10 shows a video camera 51 according to a fourth embodiment of the present invention. In FIG. 10, the components same as or similar to those of FIG. 8 are denoted respectively by the same reference symbols. Referring to FIG. 10, the video camera 51 has a configuration same as the above-described third embodiment except a central processing unit 53 arranged in a control circuit section 52.

When the central processing unit 53 executes a file splitting process and detects a file splitting cluster number AP, although the file splitting position does not agree with the cluster boundary, it reads out the header of the GOP 50 (to be referred to as GOP header hereinafter) that starts from the file splitting position D and is stored in the cluster C corresponding the file splitting cluster number AP from the data recording region RZ by means of the recording/reproduction section 8.

It is possible to set self decoding capability identifying information (self decoding capability identification flag) RI for identifying if the GOP 50 contains frame image data that cannot be decoded without referring to the immediately preceding GOP 50 (to be referred to as front side reference coded frame image data hereinafter) or not at the GOP header H of the GOP 50 as shown in FIG. 11A. Thus, when a self decoding capability identification flag RI is set at the GOP header H (to be referred to as "closed GOP" hereinafter), no front side reference coded frame image data is contained and the GOP 50 can be decoded by itself. On the other hand, when a self decoding capability identification flag RI is not set at the GOP header H of the GOP 50 (to be referred to as "open GOP" hereinafter), front side reference coded frame image data is contained and the GOP 50 cannot be decoded without using the frame image data of the immediately preceding GOP 50 as shown in FIG. 11B. Additionally, when a B frame image preceding an I frame image cannot be decoded because of a damage or for some other reason as shown in FIG. 11C, it is also possible to set decoding setting information (decoding setting flag) DI called "Broken Link" at the GOP header H so as not to decode the B frame image that cannot be decoded (to be referred to as Q frame image hereinafter).

With this arrangement, the central processing unit 53 determines if the GOP 50 that corresponds to the GOP header it reads out from the data recording region RZ contains a front side reference coded frame image data or not according to if a self decoding capability identification flag RI is set at the GOP header H or not. If a self decoding capability identification flag RI is set at the GOP header H it reads out, the central processing unit 53 determines that the GOP 50 that corresponds to the GOP header H it reads out can decode a plurality of frame images in the GOP 50 by itself and executes a process similar to that of the above-described third embodiment. If, on the other hand, a self decoding capability identification flag RI is not set at the GOP header H it reads out, the central processing unit 53 determines that the front side reference coded frame image data is contained and sets a decoding setting flag DI at the GOP header H it reads out.

As a file splitting instruction is input while a moving image is being displayed, the central processing unit 53 starts the file splitting process sequence RT4 as shown in FIGS. 11A to 11C, where the components same as those of FIG. 9 are denoted respectively by the same reference symbols. As the central processing unit 53 starts the file splitting process sequence RT4, it carries out the processing operation of Step SP1 that is same as the corresponding step of the above-described file splitting process sequence RT3 in the third embodiment and then moves to Step SP31.

In Step SP31, the central processing unit 53 determines if a self decoding capability identification flag RI is set at the GOP header H it reads out from the data recording region RZ or not. If the answer to the question at Step SP31 is affirmative, it means that the GOP 50 that corresponds to the GOP header H it reads out can decode a plurality of frame image data in the GOP 50 by itself. Therefore, the central processing unit 53 then moves to Step SP2 and sequentially carries out the processing operations of Steps SP2 through SP22 that are same as those of the file splitting process sequence RT3 of the above-described third embodiment. Thereafter, the central processing unit 53 moves to Step SP7 to end the file splitting process sequence RT4.

If, on the other hand, the answer to the question at Step SP31 is negative, it means that the GOP 50 that corresponds to the GOP header H it reads out contains the front side reference coded frame image data. Therefore, the central processing unit 53 then moves to Step SP32.

In Step SP32, the central processing unit 53 sets a decoding setting flag DI at the GOP header H it reads out and moves to the next step, or Step SP7 to end the file splitting process sequence RT4.

Thus, the video camera 51 can split a data file DF recorded in the data recording region RZ of an optical disc 20 by following the file splitting process sequence RT4.

With the above-described arrangement, when the video camera 51 finds that the file splitting position does not agree with a cluster boundary in a file splitting process and detects a file splitting cluster number AP, it reads out the GOP header H of the GOP 50 that is stored in the cluster C corresponding the file splitting cluster number AP and starts from the file splitting position D from the data recording region RZ and determines if the GOP 50 that corresponds to the GOP header H it reads out contains the front side reference coded frame image data or not according to if a self decoding capability identification flag RI is set at the GOP header H or not. If it is determined that the GOP 50 that corresponds to the GOP header H it reads out contains the front side reference coded frame image data, the video camera 51 sets a decoding setting flag DI at the GOP header it reads out.

Therefore, if the leading GOP 50 of the second split data file cannot be decoded completely without referring to the immediately preceding GOP 50, the video camera 51 can decode the entire GOP 50 without problem.

Thus, when the video camera 51 splits a data file DF recorded in the data recording region RZ at a GOP boundary 60, it determines if the front side reference coded frame image data that needs to be decoded by referring to the coded frame image data in the GOP 50 at the front side relative to the GOP boundary 60 is found in the coded frame image data in the GOP 50 at the rear side relative to the GOP boundary 60 or not and, if the video camera 51 determines that the front side reference coded frame image data is found in the rear side GOP 50, it sets a decoding setting flag DI at the GOP header H of the rear side GOP 50 so that the front side reference coded frame image data may not be decoded. Then, as a result, when the video camera 51 splits a data file DF into a first split data file and a second split data file, it can decode the entire leading GOP 50 of the second split data file without problem if the GOP 50 cannot be decoded completely without referring to the immediately preceding GOP 50.

(5) Other Embodiments

While the splitting position cluster recording part R before the copying is made to be part of the first split data file and the splitting position cluster recording part R after the copying is made to be part of the second split data file in the above description of the first through fourth embodiments, the present invention is by no means limited thereto and it may alternatively be so arranged that the splitting position cluster recording part R after the copying is made to be part of the first split data file and the splitting position cluster recording part R before the copying is made to be part of the second split data file.

While the present invention is applied to a data file including program streams formed by compression coding according to MPEG in the case of the first through fourth embodiments described above by referring to FIGS. 1 through 12, the present invention is by no means limited thereto and the present invention can be applied to files that are compression coded according to various kinds of generally used compression coding methods or files not compression coded.

While the present invention is applied to management information for data files according to a FAT file system in the case of the first through fourth embodiments described above by referring to FIGS. 1 through 12, the present invention is by no means limited thereto and the present invention can be applied to other management information in various different ways unless part of a data file can be managed as part of some other data file according to such management information.

While the head of a GOP 50 is detected in order to identify a GOP boundary 60 as file splitting position in the above-described first through third embodiments, the present invention is by no means limited thereto and the tail end of a GOP 50 may alternatively be detected. Still alternatively, it may be so arranged as to detect the head or the tail end of packet data or some other unit of data.

While the present invention is applied to an optical disc as recording medium for recording data files in the first through fourth embodiments described above by referring to FIGS. 1 through 12, the present invention is by no means limited thereto and the present invention can also be applied to various other storage mediums such that can record data files such as Compact Discs (CDs) and other types of optical discs, semiconductor memories, Hard Disk Drives (HDDs) and FLOPPY (Registered Trademark) Disks(FDs).

While the present invention is applied to video cameras 1, 31, 41 and 51 as file splitting apparatus according to the invention in the first through fourth embodiments described above by referring to FIGS. 1 through 12, the present invention is by no means limited thereto and the present invention can also be applied to file splitting apparatus of various other types such as Hard Disk (HD) recorders, HD video cameras and personal computers.

While central processing units 3, 33, 43, 53 are applied as management region recording part detecting section for detecting a management region recording part that includes a file splitting position out of a plurality of management region recording parts recorded in a plurality of recording management regions of a data file recorded in a recording region when splitting the data file at a predetermined file splitting position in the above description of the first through fourth embodiments given above by referring to FIGS. 1 through 12, the present invention is by no means limited thereto and a management region recording part detecting circuit that is formed as hardware or some other management region recording part detecting section may alternatively be applied to detect a management region recording part that includes a file splitting position out of a plurality of management region recording parts recorded in a plurality of recording management regions of a data file recorded in a recording region when splitting the data file at a predetermined file splitting position.

While the central processing units 3, 33, 43, 53 are applied as management region recording part copying section for copying the management region recording part including the file splitting position detected by the management region recording part detecting section to some other recording management region of the recording region in the above description of the first through fourth embodiments given above by referring to FIGS. 1 through 12, the present invention is by no means limited thereto and a management region recording part copying circuit that is formed as hardware or some other management region recording part copying section may alternatively be applied to copy the management region recording part that includes the file splitting position to some other recording management region of the recording region.

Additionally, while the central processing units 3, 33, 43, 53 are applied as management information altering section for altering the management information of a data file to first management information for managing one of the split data files obtained by splitting the data file at a file splitting position and second management information for managing the other split data file in the description of the first through fourth embodiments given above by referring FIGS. 1 through 12, the present invention is by no means limited thereto and a management information altering circuit that is formed as hardware or some other management information altering section may alternatively be applied to alter the management information of a data file to first management information for managing one of the split data files obtained by splitting the data file at a file splitting position and second management information for managing the other split data file.

Still additionally, while the central processing units 3, 33, 43, 53 are applied as splitting position determining section for determining if a file splitting position agrees with the boundary of adjacent recording management regions or not when splitting a data file recorded in the recording region at the boundary of two consecutive unit image groups as file splitting position in the above description of the second through fourth embodiments given above by referring to FIGS. 1 through 12, the present invention is by no means limited thereto and a splitting position determining circuit that is formed as hardware or some other splitting position determining section may alternatively be applied to determine if a file splitting position is located at the boundary of two adjacent recording management regions or not when splitting a data file recorded in the recording region at the boundary of two consecutive unit image groups as file splitting position.

Still additionally, while the central processing unit 3, 33, 43, 53 are applied as registration information generating section for generating first file registration information for registering a data file that is made to correspond to the management information in the recording management region where the leading management region recording part of the data file is recorded when the data file is recorded in the recording region and generating second file registration information for registering one of the split data files that is made to correspond to the second management information in one of the recording management regions where the management region recording part including a file splitting position is copied by using the first file registration information to register the other split data file or generating second file registration information for registering the other split data file that is made to correspond to the first management information in the other recording management region where the management region recording part including the file splitting position is recorded by using the first file registration information to register the former split data file when the data file is split at the file splitting position in the above description of the first through fourth embodiments given above by referring to FIGS. 1 through 12, the present invention is by no means limited thereto and a registration information generating circuit that is formed as hardware or some other registration information generating section may alternatively be applied to generate first file registration information for registering a data file that is made to correspond to the management information in the recording management region where the leading management region recording part of the data file is recorded when the data file is recorded in the recording region and generate second file registration information for registering one of the split data files that is made to correspond to the second management information in one of the recording management regions where the management region recording part including a file splitting position is copied by using the first file registration information to register the other split data file or generate second file registration information for registering the other split data file that is made to correspond to the first management information in the other recording management region where the management region recording part including the file splitting position is recorded by using the first file registration information to register the former split data file when the data file is split at the file splitting position.

Still additionally, the recording/reproduction section 8 described above by referring to FIGS. 1 through 12 is applied as recording section for recording program streams that is put into a group, or a GOP, as a predetermined unit of coded frame image data of a plurality of consecutive coded frame image data to be recorded as data file, the coded frame image data being generated from moving image data formed by a plurality of consecutive frame image data by compression coding by means of a compression coding system conforming to the MPEG Standards, in the above description of the fourth embodiment, the present invention is by no means limited thereto and any other recording section such as Hard Disk (HD) recorders, HD video cameras and personal computers may alternatively applied for the purpose of the present invention.

Furthermore, while the central processing units 3, 33, 43, 53 described above by referring to FIGS. 1 through 12 are applied as determining section for determining if the front side reference coded frame image data that is to be decoded by referring to the coded frame image data in the front side GOP relative to the boundary is found in the coded frame image data in the rear side GOP relative to a boundary when a data file that is recorded in the recording region is split at a file splitting position on the boundary of two consecutive GOPs in the above description of the fourth embodiment, the present invention is by no means limited thereto and a determining circuit that is formed as hardware or some other determining section may alternatively be applied to determine if the front side reference coded frame image data that is to be decoded by referring to the coded frame image data in the front side GOP relative to the boundary is found in the coded frame image data in the rear side GOP relative to a boundary when a data file that is recorded in the recording region is split at a file splitting position on the boundary of two consecutive GOPs.

Finally, while the central processing units 3, 33, 43 53 described above by referring to FIGS. 1 through 12 are applied as setting section for setting the rear side GOP so as not to decode the front side reference coded frame image data when it is determined by the determining section that the front side reference coded frame image data is found in the rear side GOP in the above description of the fourth embodiment, the present invention is by no means limited thereto and a setting circuit that is formed as hardware or some other setting section may alternatively be applied to set the rear side GOP so as not to decode the front side reference coded frame image data when it is determined by the determining section that the front side reference coded frame image data is found in the rear side GOP.

The present invention can find applications in the field of file splitting apparatus such as video cameras adapted to execute a splitting process for splitting a recorded file.

It should be understood by those skilled in the art that various modifications, combinations, sub-combinations and alterations may occur depending on design requirements and other factors insofar as they are within the scope of the appended claims or the equivalents thereof.

What is claimed is:

1. A file splitting apparatus for splitting a data file having coded moving image data arranged in groups of pictures recorded over a plurality of recording management regions arranged in the recording region of a recording medium, the apparatus comprising: a management region recording part detecting section for detecting a management region recording part including a file splitting position out of a plurality of management region recording parts of a plurality of recording management regions of the data file recorded in the recording region at the time of being split at a predetermined file splitting position; a management region recording part copying section for copying the management region recording part including the file splitting position as detected by the management region recording part detecting section to some other recording management region of the recording region; and a management information altering section for altering the management information of the data file to first management information for managing one of the split data files obtained by splitting the data file at the file splitting position and second management information for managing the other split data file; a determining section for determining whether a front side reference coded frame image data is to be decoded by referring to the coded frame image data in the front side groups of pictures relative to a boundary of two consecutive groups of pictures is found in the coded frame image data in a rear side groups of pictures relative to the boundary when the data file that is recorded in the recording region is split at the predetermined file splitting position on the boundary of the two consecutive group of pictures; and a setting section for setting the rear side group of images so as not to decode the front side reference coded frame image data when the determining section determines that the front side reference coded frame image data is found in the rear side groups of images, wherein the management information altering section is configured to alter the management information of the data file to the first management information of one of the split data files so as to make it contain the management region recording part including the file splitting position before the copying as part thereof and the second management information of the other split data file so as to make it contain the management region recording part including the copied file splitting position.

2. The file splitting apparatus according to claim 1, wherein when the data file recorded in the recording region is split at the file splitting position located on the boundary of two consecutive group of pictures, the management region recording part detecting section detects the management region recording part containing either the tail end frame image data in a front side group of pictures relative to the boundary or the leading frame image data in the rear side group of pictures relative to the boundary as management region recording part including the file splitting position.

3. The file splitting apparatus according to claim 2, further comprising a splitting position determining section for determining if the file splitting position is located at the boundary of two adjacent recording management regions when the data file recorded in the recording region is split at the file splitting position located on the boundary of two consecutive groups of pictures, and wherein the management region recording part copying section is adapted so as not to copy the management region recording part including the file splitting position to the other recording management region when the splitting position determining section determines that the file splitting position is located on the boundary of two adjacent recording management regions.

4. The file splitting apparatus according to claim 1, wherein the management region recording part copying section overwrites the part where the data of the other split data file is left in the recording management region where the management region recording part including the file splitting position before the copying is recorded as part of the former split data file with dummy data for recording and also overwrites the part where the data of the former split data file is left in the other recording management region where the management region recording part including the file splitting position is recorded as part of the latter split data file with dummy data for recording.

5. The file splitting apparatus according to claim 1, further comprising
a registration information generating section for generating first file registration information for registering a data file that is made to correspond to the management information in the recording management region where the leading management region recording part of the data file is recorded when the data file is recorded in the recording region and generating second file registration information for registering one of the split data files that is made to correspond to the second management information in one of the recording management regions where the management region recording part including a file splitting position is copied by using the first file registration information to register the other split data file or generating second file registration information for registering the other split data file that is made to correspond to the first management information in the other recording management region where the management region recording part including the file splitting position is recorded by using the first file registration information to register the former split data file when the data file is split at the file splitting position.

6. The file splitting apparatus according to claim 1, further comprising: a recording section for recording program streams as the plurality of consecutive coded frame image data being generated by processing the moving image data in the form of plurality of consecutive frame image data by compression coding by means of a compression coding system conforming to the Moving Picture Experts Group (MPEG) Standards.

7. The file splitting apparatus according to claim 1, wherein the management information is management information according to a File Allocation Tables (FAT) file system.

8. A file splitting method for splitting a data file having coded moving image data arranged in groups of pictures recorded over a plurality of recording management regions arranged in the recording region of a recording medium, the method comprising: detecting step of detecting a management region recording part including a file splitting position out of a plurality of management region recording parts of a plurality of recording management regions of the data file recorded in the recording region at the time of being split at a predetermined file splitting position; copying the management region recording part including the detected file splitting position to some other recording management region of the recording region; altering the management information of the data file to first management information for managing one of the split data files obtained by splitting the data file at the file splitting position so as to make it contain the management region recording part including the file splitting position before the copying as part thereof and second management information for managing the other split data file so as to make it contain the management region recording part including the copied file splitting position; determining whether a front side reference coded frame image data is to be decoded by referring to the coded frame image data in the front side groups of pictures relative to a boundary of two consecutive group of pictures is found in the coded frame image data in a rear side groups of pictures relative to the boundary when the data file that is recorded in the recording region is split at the predetermined file splitting position on the boundary of the two consecutive group of pictures; and setting the rear side group of images so as not to decode the front side reference coded frame image data when the determining section determines that the front side reference coded frame image data is found in the rear side groups of images.

9. A computer readable medium with computer readable instructions stored thereon for causing a computer to perform a method of splitting a data file having coded moving image data arranged in groups of pictures recorded over a plurality of recording management regions arranged in the recording region of a recording medium, the method comprising: detecting a management region recording part including a file splitting position out of a plurality of management region recording parts of a plurality of recording management regions of the data file recorded in the recording region at the time of being split at a predetermined file splitting position; copying the management region recording part including the detected file splitting position to some other recording management region of the recording region; altering step of altering the management information of the data file to first management information for managing one of the split data files obtained by splitting the data file at the file splitting position so as to make it contain the management region recording part including the file splitting position before the copying as part thereof and second management information for managing the other split data file so as to make it contain the management region recording part including the copied file splitting position determining whether a front side reference coded frame image data is to be decoded by referring to the coded frame image data in the front side groups of pictures relative to a boundary of two consecutive groups of pictures is found in the coded frame image data in a rear side groups of pictures relative to the boundary when the data file that is recorded in the recording region is split at the predetermined file splitting position on the boundary of the two consecutive groups of pictures; and setting the rear side groups of images so as not to decode the front side reference coded frame image data when the determining section determines that the front side reference coded frame image data is found in the rear side groups of images.

\* \* \* \* \*